United States Patent
You et al.

(10) Patent No.: US 10,263,747 B2
(45) Date of Patent: Apr. 16, 2019

(54) DOWNLINK SIGNAL RECEPTION METHOD AND USER EQUIPMENT, AND DOWNLINK SIGNAL TRANSMISSION METHOD AND BASE STATION

(71) Applicant: LG ELECTRONICS INC., Seoul (KR)

(72) Inventors: Hyangsun You, Seoul (KR); Yungjung Yi, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/542,051

(22) PCT Filed: Jan. 6, 2016

(86) PCT No.: PCT/KR2016/000106
§ 371 (c)(1),
(2) Date: Jul. 6, 2017

(87) PCT Pub. No.: WO2016/111549
PCT Pub. Date: Jul. 14, 2016

(65) Prior Publication Data
US 2018/0013529 A1    Jan. 11, 2018

Related U.S. Application Data

(60) Provisional application No. 62/100,066, filed on Jan. 6, 2015, provisional application No. 62/204,999, filed on Aug. 14, 2015, provisional application No. 62/207,926, filed on Aug. 21, 2015, provisional application No. 62/251,698, filed on Nov. 6, 2015.

(51) Int. Cl.
*H04L 5/00* (2006.01)
*H04L 25/02* (2006.01)
(Continued)

(52) U.S. Cl.
CPC .............. *H04L 5/0048* (2013.01); *H04L 5/00* (2013.01); *H04L 12/189* (2013.01); *H04L 25/02* (2013.01);
(Continued)

(58) Field of Classification Search
CPC .................................................... H04L 5/0048
(Continued)

(56) References Cited

U.S. PATENT DOCUMENTS

2012/0033643 A1* 2/2012 Noh ................... H04L 5/0048
370/335
2012/0176939 A1* 7/2012 Qu ..................... H04L 5/0023
370/255
(Continued)

FOREIGN PATENT DOCUMENTS

WO    2014069945    5/2014
WO    2014171888    10/2014
(Continued)

OTHER PUBLICATIONS

PCT International Application No. PCT/KR2016/000106, Written Opinion of the International Searching Authority dated Apr. 11, 2016, 26 pages.

*Primary Examiner* — Samina F Choudhry
(74) *Attorney, Agent, or Firm* — Lee Hong Degerman Kang Waimey

(57) ABSTRACT

Provided are a method and an apparatus for transmitting or receiving a downlink reference signal. A cell-specific downlink reference signal (CRS) is transmitted in a partial frequency band of the entire downlink frequency band. Configuration information of the CRS transmitted in the partial frequency band is provided to user equipment. The CRS transmitted in the partial frequency band may be used in downlink channel measurement alone or together with a legacy CRS.

20 Claims, 13 Drawing Sheets

(51) Int. Cl.
   *H04L 27/26* (2006.01)
   *H04L 12/18* (2006.01)
   *H04W 24/08* (2009.01)
   *H04W 72/04* (2009.01)
   *H04W 88/02* (2009.01)
   *H04W 88/08* (2009.01)

(52) U.S. Cl.
   CPC ............ *H04L 27/26* (2013.01); *H04W 24/08* (2013.01); *H04W 72/042* (2013.01); *H04W 72/044* (2013.01); *H04W 88/02* (2013.01); *H04W 88/08* (2013.01)

(58) Field of Classification Search
   USPC ........................................................ 370/252
   See application file for complete search history.

(56) References Cited

U.S. PATENT DOCUMENTS

| | | | | |
|---|---|---|---|---|
| 2013/0114498 A1* | 5/2013 | Park | ............ | H04W 4/06 370/312 |
| 2013/0322363 A1* | 12/2013 | Chen | ............ | H04W 72/042 370/329 |
| 2014/0254504 A1 | 9/2014 | Bashar et al. | | |
| 2014/0301301 A1* | 10/2014 | Cheng | ............ | H04L 5/0048 370/329 |
| 2016/0044642 A1* | 2/2016 | Xu | ............ | H04W 4/70 370/329 |

FOREIGN PATENT DOCUMENTS

| WO | 2014204128 | 12/2014 |
|---|---|---|
| WO | 2014208940 | 12/2014 |

* cited by examiner (a) 1 or 2 TX case (b) 4 TX case

[p] RE occupied by CRS of port p ( p∈0, p∈0,1 or p∈0,1,2,3 )

▨ RE occupied by UE-RS of port(s) p ( p∈7, p∈8, p∈7,8 or p∈7,8,11,13 )

▨ RE occupied by UE-RS of port(s) p ( p∈9, p∈10, p∈9,10 or p∈9,10,12,14 )

DOWNLINK SIGNAL RECEPTION METHOD AND USER EQUIPMENT, AND DOWNLINK SIGNAL TRANSMISSION METHOD AND BASE STATION

CROSS-REFERENCE TO RELATED APPLICATIONS

This application is the National Stage filing under 35 U.S.C. 371 of International Application No. PCT/KR2016/000106, filed on Jan. 6, 2016, which claims the benefit of U.S. Provisional Application No. 62/100,066, filed on Jan. 6, 2015, 62/204,999, filed on Aug. 14, 2015, 62/207,926, filed on Aug. 21, 2015 and 62/251,698, filed on Nov. 6, 2015, the contents of which are all hereby incorporated by reference herein in their entirety.

TECHNICAL FIELD

The present invention relates to a wireless communication system and, more particularly, to a method for receiving or transmitting downlink signal and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

Technical Solutions

A method and apparatus for transmitting or receiving a DL reference signal are provided. A cell-specific DL reference signal (CRS) may be transmitted in a partial frequency band of an entire DL frequency band. Configuration information of the CRS transmitted in the partial frequency band may be provided to a UE. The CRS transmitted in the partial frequency band may be used for DL channel measurement solely or together with a legacy CRS.

According to an aspect of the present invention, provided herein is a method of receiving a downlink (DL) reference signal by a user equipment (UE), including receiving configuration information of a narrow cell-specific reference signal (narrow-CRS) transmitted in a partial frequency band of an entire DL system frequency band; receiving the narrow-CRS in the partial frequency band on symbols other than two front symbols of a subframe, based on the configuration information; and performing DL channel measurement based on a legacy CRS and the narrow-CRS.

In another aspect of the present invention, provided herein is a user equipment (UE) for receiving a downlink (DL) reference signal, including a radio frequency (RF) unit and a processor configured to control the RF unit, wherein the processor is configured to: control the RF unit to receive configuration information of a narrow cell-specific reference signal (narrow-CRS) transmitted in a partial frequency band of an entire DL system frequency band, control the RF unit to receive the narrow-CRS in the partial frequency band on symbols other than two front symbols of a subframe, based on the configuration information; and perform DL channel measurement based on a legacy CRS and the narrow-CRS.

In another aspect of the present invention, provided herein is a method of transmitting a downlink (DL) reference signal by a base station (BS), including transmitting configuration information of a narrow cell-specific reference signal (narrow-CRS) transmitted in a partial frequency band of an entire DL system frequency band; transmitting the narrow-CRS in the partial frequency band on symbols other than two front symbols of a subframe, based on the configuration information; and receiving a result of DL channel measurement based on a legacy CRS and the narrow-CRS.

In another aspect of the present invention, provided herein is a base station (BS) for transmitting a downlink (DL) reference signal, including a radio frequency (RF) unit and a processor configured to control the RF unit, wherein the processor is configured to: control the RF unit to transmit configuration information of a narrow cell-specific reference signal (narrow-CRS) transmitted in a partial frequency band of an entire DL system frequency band; control the RF unit to transmit the narrow-CRS in the partial frequency band on symbols other than two front symbols of a subframe, based on the configuration information; and control the RF unit to receive a result of DL channel measurement based on a legacy CRS and the narrow-CRS.

In each aspect of the present invention, the configuration information may at least include information indicating presence/absence of the narrow-CRS, a location of a subframe at which the narrow-CRS is transmitted, or a power boosted degree of the narrow-CRS.

In each aspect of the present invention, the legacy CRS may be received in the entire DL system frequency band on the two front symbols of the subframe.

In each aspect of the present invention, the subframe may be a multicast broadcast single frequency network (MBSFN) subframe.

In each aspect of the present invention, the DL channel measurement may be performed by assigning different power weights to the legacy CRS and the narrow-CRS.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a wireless communication system is improved.

According to an embodiment of the present invention, a low-price/low-cost UE can communicate with a BS while maintaining compatibility with a legacy system.

According to an embodiment of the present invention, a UE can be implemented with low price/low cost.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
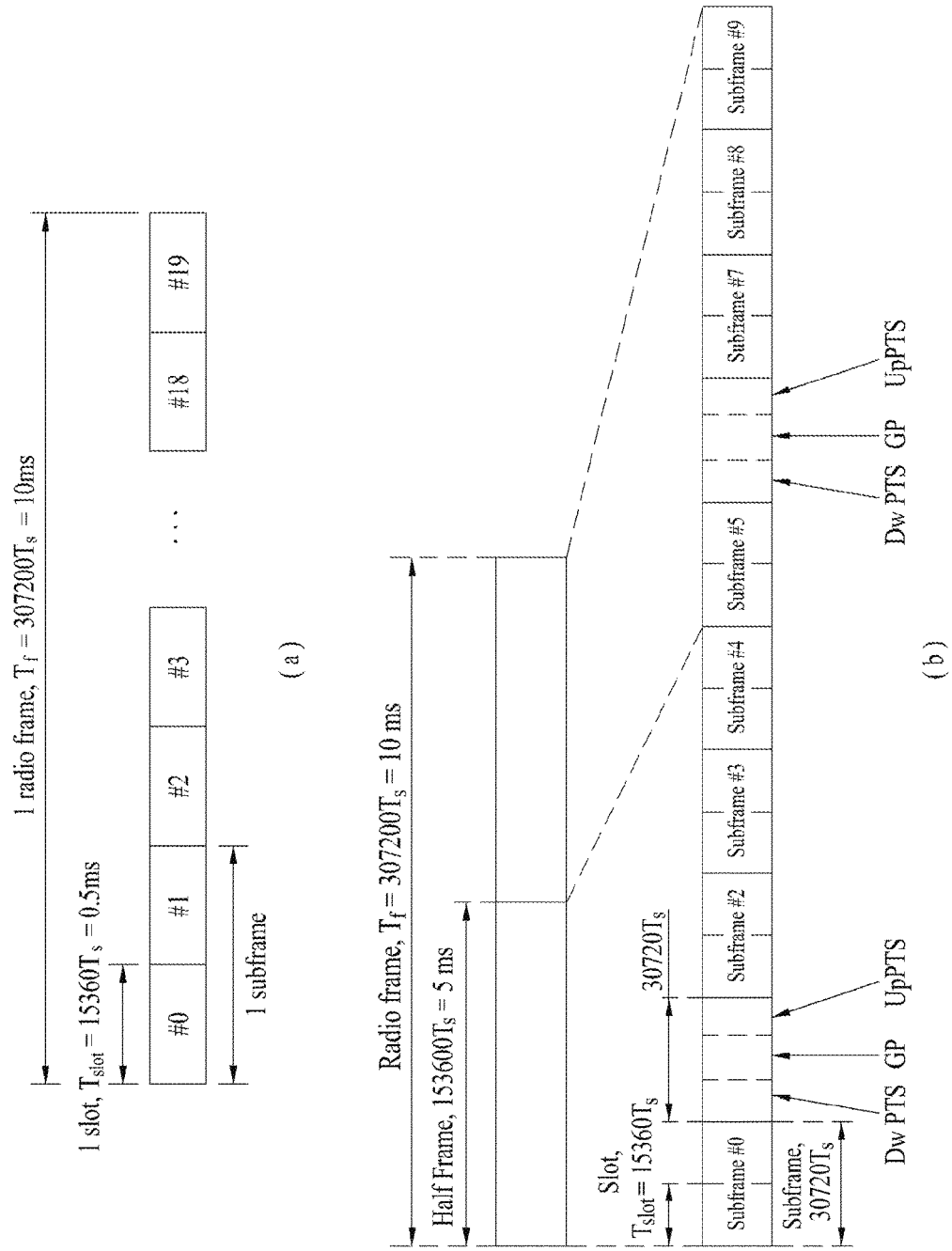
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for a determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. For a detailed CSI-RS configuration, refer to documents such as 3GPP TS 36.211 and 3GPP TS 36.331.

Meanwhile, a 3GPP LTE/LTE-A system uses the concept of a cell to manage a radio resource. A cell associated with the radio resource is different from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in down | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
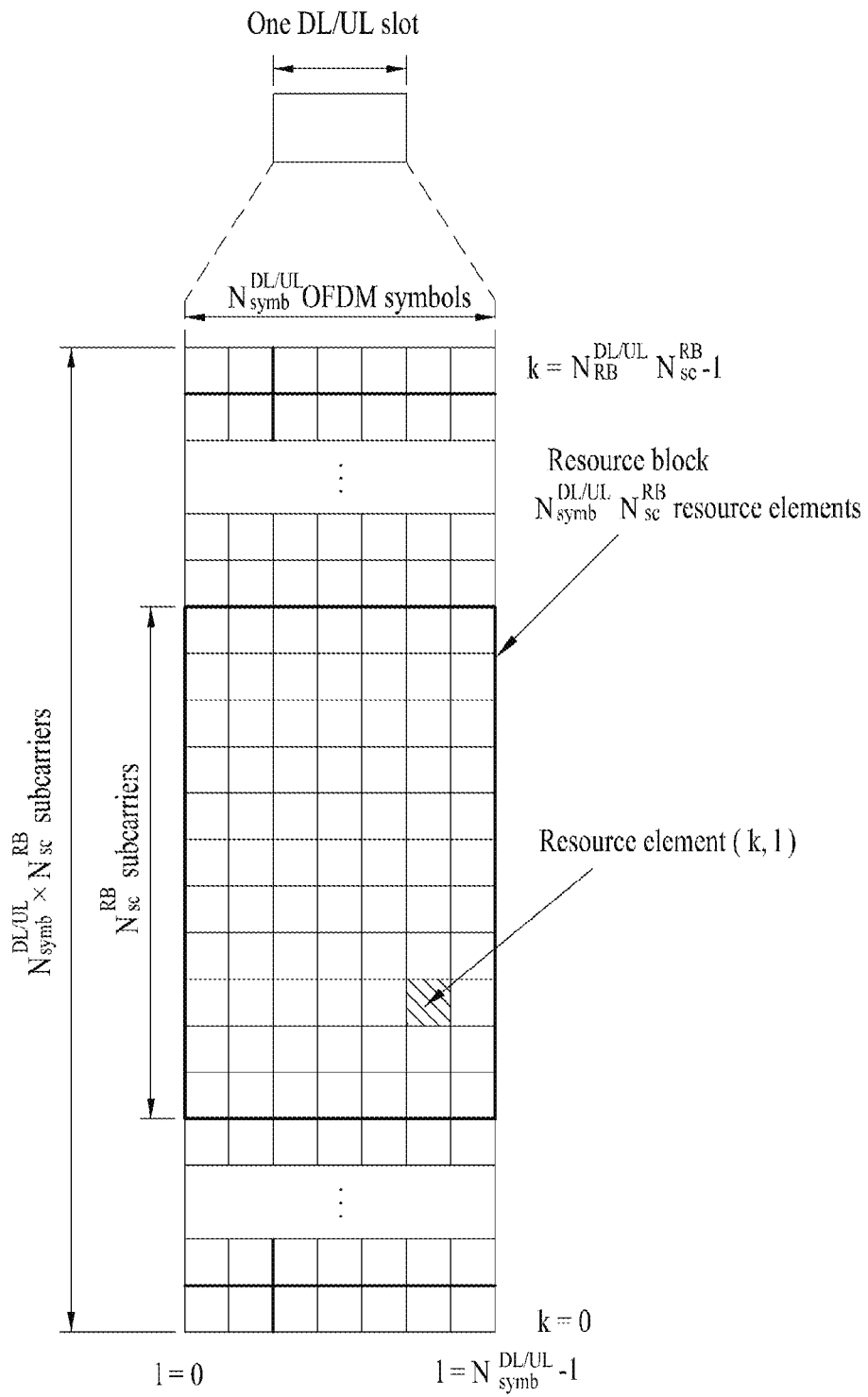
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{DL}_{RB}$ denotes the number of RBs in a UL slot. $N^{DL}_{RB}$ and $N^{DL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12)

consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
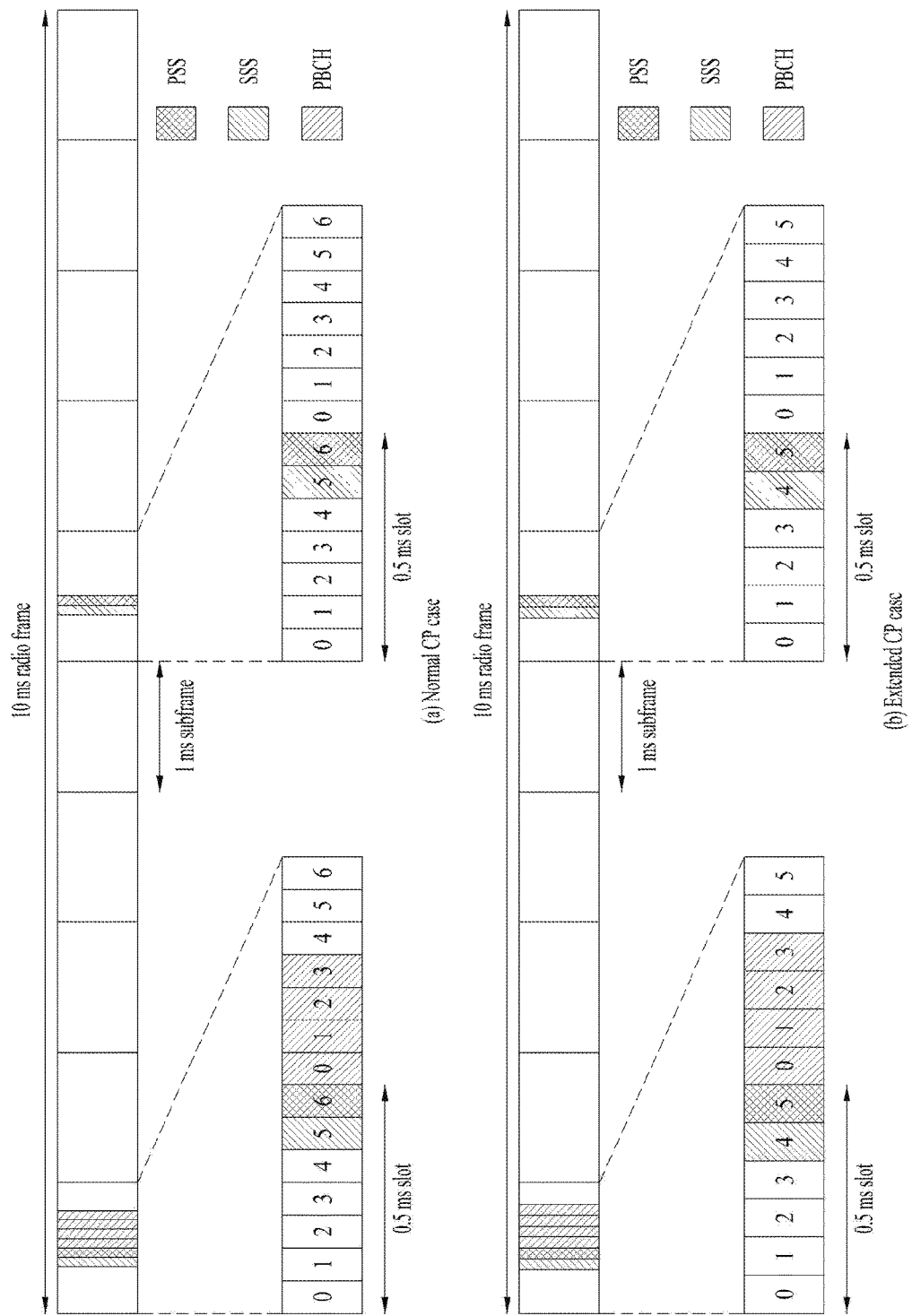
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB17 according to included parameters.

The MIB includes most frequency transmitted parameters which are essential for initial access of the UE to a network of the eNB. The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

SIB1 includes not only information about time-domain scheduling of other SIBs but also parameters needed to determine whether a specific cell is suitable for cell selection. SIB1 is received by the UE through broadcast signaling or dedicated signaling.

A DL carrier frequency and a system BW corresponding to the DL carrier frequency may be acquired by the MIB that the PBCH carries. A UL carrier frequency and a system BW corresponding to the UL carrier frequency may be acquired through system information which is a DL signal. If no stored valid system information about a corresponding cell is present as a result of receiving the MIB, the UE applies a DL BW in the MIB to a UL BW until SIB2 is received. For example, the UE may recognize an entire UL system BW which is usable for UL transmission thereby through UL-carrier frequency and UL-BW information in SIB2 by acquiring SIB2.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDDCH/PDSCH reception and PUSCH/PUCCH transmission as general uplink/downlink transmission procedures.

Figure 4:
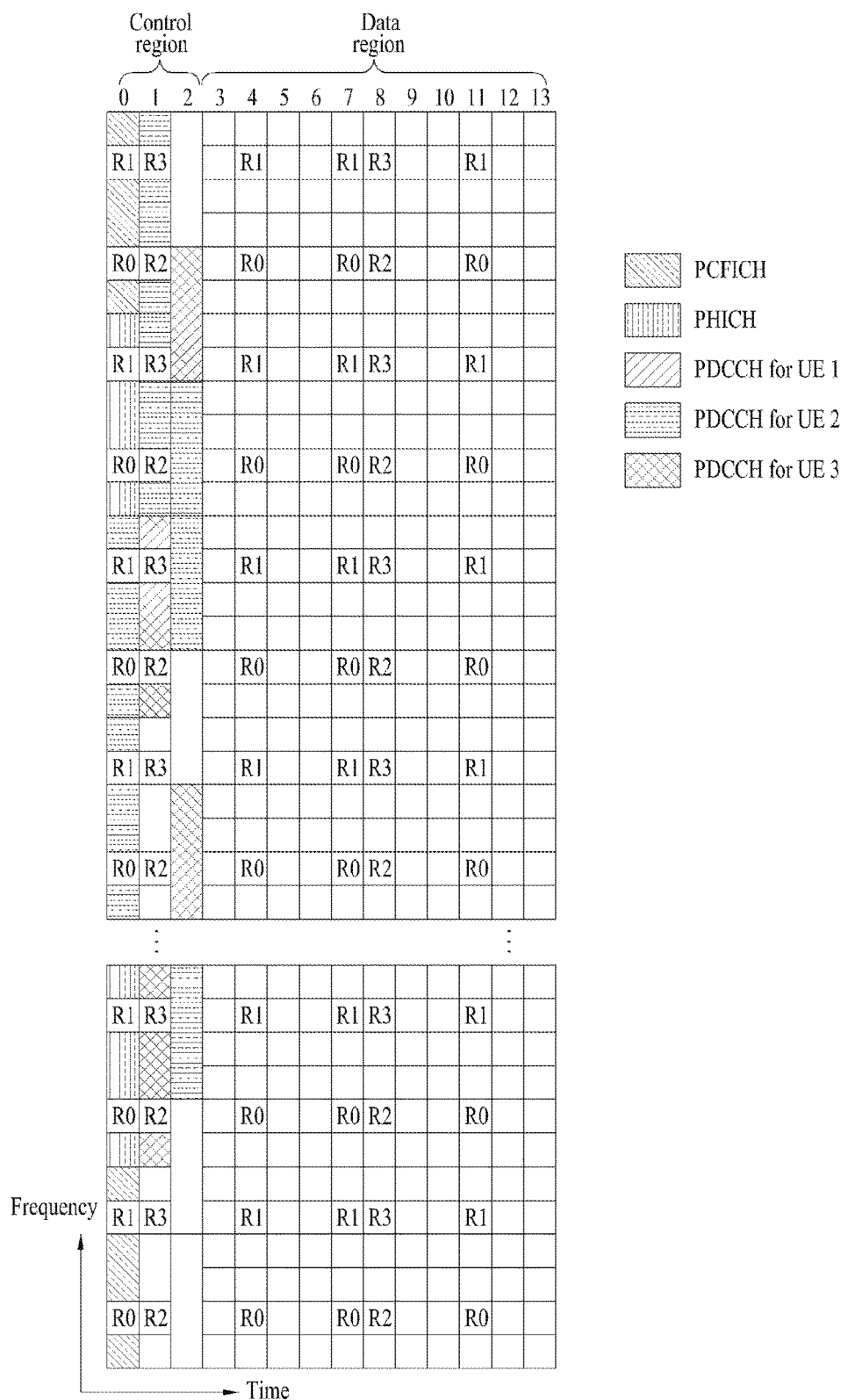
FIG. 4 illustrates the structure of a DL subframe used in a wireless communication system.

FIG. 4 illustrates the structure of a DL subframe used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PC-FICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs. One REG includes 4 REs. The structure of the REG will be described in more detail with reference to FIG. 5.

A set of OFDM symbols available for the PDCCH at a subframe is given by the following table.

TABLE 3

| Subframe | Number of OFDM symbols for PDCCH when $N^{DL}_{RB} > 10$ | Number of OFDM symbols for PDCCH when $N^{DL}_{RB} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of DL subframes in a radio frame on a carrier supporting PDSCH transmission may be configured as MBSFN subframe(s) by a higher layer. Each MBSFN subframe is divided into a non-MBSFN region and an MBSFN region. The non-MB SFN region spans one or two front OFDM symbols, wherein the length of the non-MBSFN region is given by Table 3. For transmission in the non-MBSFN region of the MBSFN subframe, the same cyclic prefix (CP) as a CP used for subframe 0 is used. The MBSFN region in the MBSFN subframe is defined as OFDM symbols which are not used for the non-MB SFN region.

The PCFICH carries a control format indicator (CFI), which indicates any one of values of 1 to 3. For a downlink system bandwidth $N^{DL}_{RB} > 10$, the number 1, 2 or 3 of OFDM symbols which are spans of DCI carried by the PDCCH is given by the CFI. For a downlink system bandwidth $N^{DL}_{RB} \leq 10$, the number 2, 3 or 4 of OFDM symbols which are spans of DCI carried by the PDCCH is given by CFI+1. The CFI is coded in accordance with the following Table.

TABLE 4

| CFI | CFI code word $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table lists DCI formats.

TABLE 5

| DCI format | Description |
|---|---|
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |

TABLE 5-continued

| DCI format | Description |
|---|---|
| 4 | Scheduling of PUSCH in one UL Component Carrier with multi-antenna port transmission mode |

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is assigned to the first m OFDM symbol(s) in a subframe, wherein m is an integer equal to or greater than 1 and is indicated by a PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

In a system, CCEs available for PDCCH transmission are numbered from 0 to $N_{CCE}-1$, wherein $N_{CCE}=\text{floor}(N_{REG}/9)$ and $N_{REG}$ denotes the number of REGs which are not allocated to a PCFICH or a PHICH.

A DCI format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Figure 5:
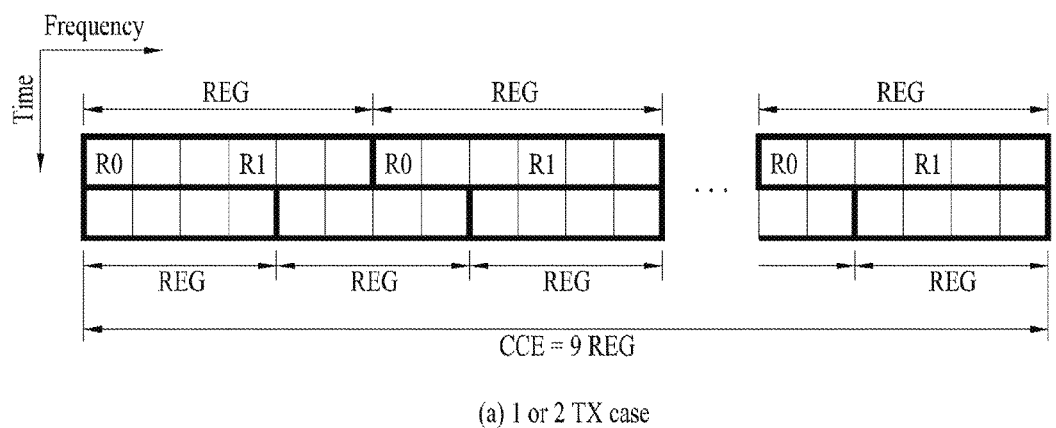
FIG. 5 illustrates a resource unit used to configure a DL control channel.
Figure 5:
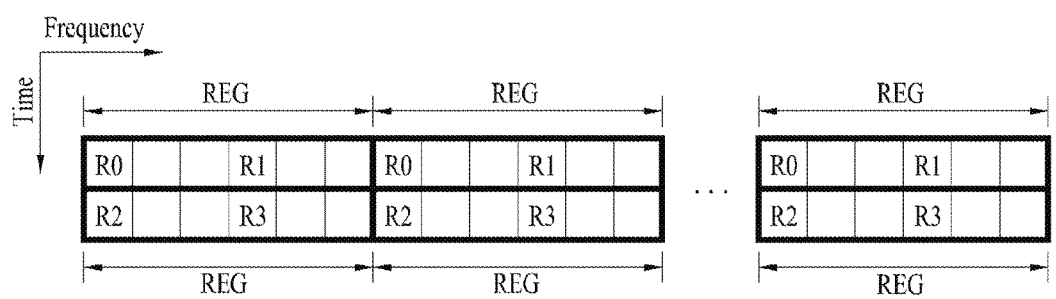

FIG. 5 illustrates a resource unit used to configure a DL control channel.

FIG. 5(a) illustrates a resource unit when the number of transmission antenna ports is 1 or 2 and FIG. 5(b) illustrates a resource unit when the number of transmission antenna ports is 4. Only CRS patterns are different according to the number of transmission antennas and methods of configuring a resource unit related to a control channel are identical. Referring to FIG. 5, a resource unit for a control channel is an REG. The REG includes 4 neighboring REs excluding a CRS. That is, the REG includes REs except for REs indicated by any one of R0 to R3 in FIG. 5. A PFICH and a PHICH include 4 REGs and 3 REGs. A PDCCH is configured in units of CCEs each including 9 REGs. While REGs constituting a CCE are adjacent to each other in FIG. 5, 9 REGs constituting the CCE may be distributed on a frequency and/or time axis in a control region.

Figure 6:
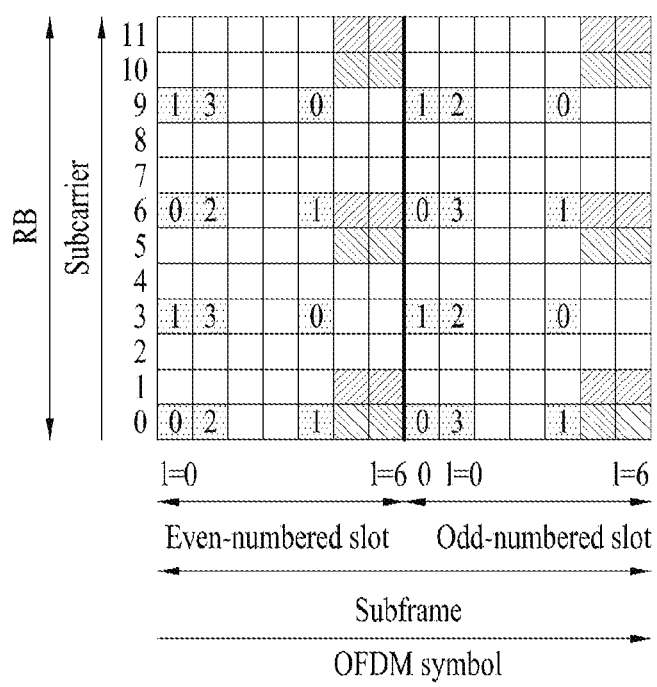
FIG. 6 illustrates configuration of cell specific reference signals (CRSs) and user specific reference signals (UE-RS).

FIG. 6 illustrates configuration of cell specific reference signals (CRSs) and user specific reference signals (UE-RS). In particular, FIG. 6 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

Referring to FIG. 6, a CRS is transmitted through antenna port p=0, p=0, 1, or p=0, 1, 2, 3 according to the number of antenna ports of a transmission node. The CRS is fixed to a predetermined pattern in a subframe regardless of a control region and a data region. A control channel is allocated to a resource on which the CRS is not allocated in the control region and a data channel is allocated to a resource on which the CRS is not allocated in the data region.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of a DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

Referring to FIG. 6, UE-RSs are transmitted on antenna port(s) p=5, p=7, p=8 or p=7, 8, . . . , υ+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

The CSI-RS is a DL RS introduced for channel measurement. In the 3GPP LTE-A system, a plurality of CSI-RS configurations is defined for CSI-RS transmission.

Figure 7:
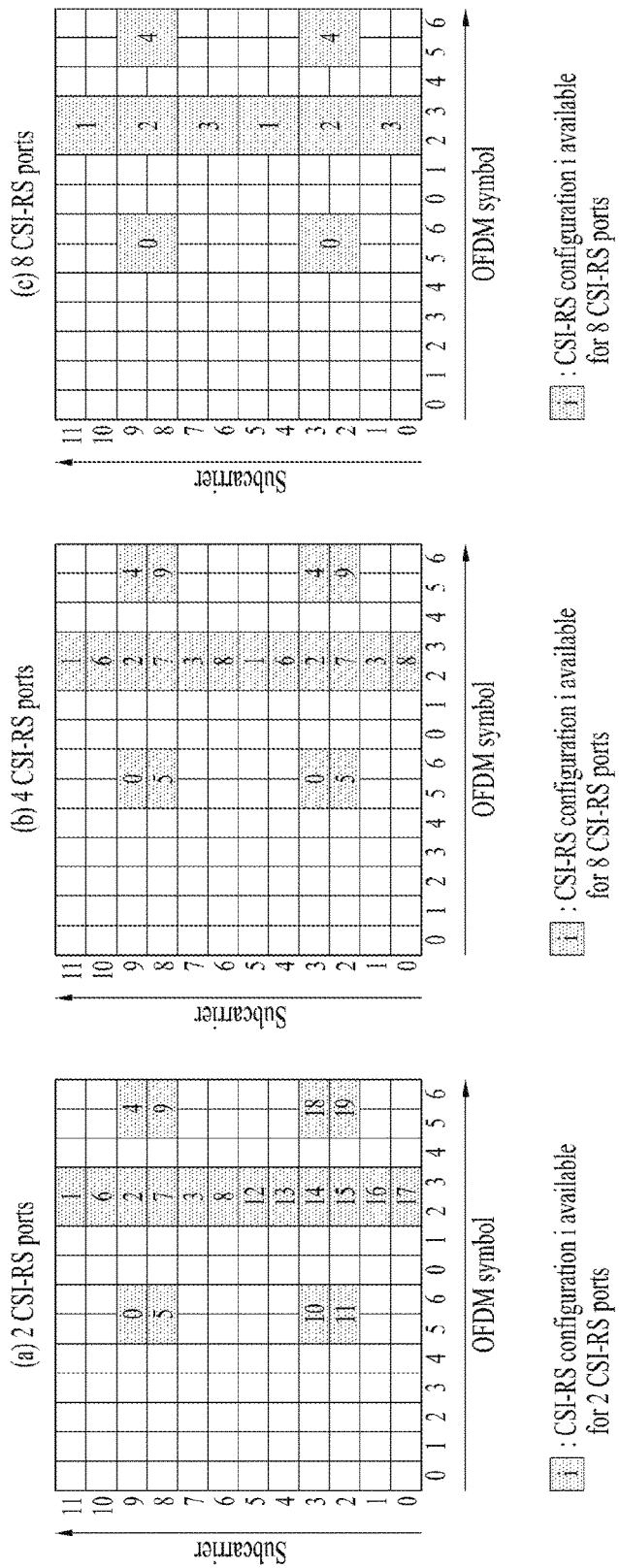
FIG. 7 illustrates channel state information reference signal (CSI-RS) configurations.

FIG. 7 illustrates CSI-RS configurations. Particularly, FIG. 7(a) illustrates 20 CSI-RS configurations 0 to 19 available for CSI-RS transmission through two CSI-RS ports among the CSI-RS configurations, FIG. 7(b) illustrates 10 available CSI-RS configurations 0 to 9 through four CSI-RS ports among the CSI-RS configurations, and FIG. 7(c) illustrates 5 available CSI-RS configurations 0 to 4 through 8 CSI-RS ports among the CSI-RS configurations. The CSI-RS ports refer to antenna ports configured for CSI-RS transmission. For example, referring to Equation 15, antenna ports 15 to 22 correspond to the CSI-RS ports. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair but also with subframes in which CSI-RSs are configured. That is, if subframes for CSI-RS transmission differ even when CSI-RS configuration numbers are the same, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations. Hereinafter, in order to distinguish between a CSI-RS configuration to which a CSI-RS configuration number is assigned and a CSI-RS configuration varying according to a CSI-RS configuration number, the number of CSI-RS ports, and/or a CSI-RS configured subframe, the CSI-RS configuration of the latter will be referred to as a CSI-RS resource configuration.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback $P_c$, a zero-power CSI-RS configuration list, a zero-power CSI-RS subframe configuration, etc.

CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table shows CSI-RS subframe configuration $I_{CSI-RS}$ according to $T_{CSI-RS}$ and $\Delta_{CSI-RS}$.

TABLE 6

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Subframes satisfying $\{10n_f+\text{floor}(n_s/2)-\Delta_{CSI-RS}\}$ mod $T_{CSI-RS}=0$ are subframes including CSI-RSs, where $n_f$ is a radio frame number, $n_s$ is a slot number in the radio frame.

$P_c$ is the ratio of PDSCH EPRE to CSI-RS EPRE, assumed by the UE when the UE derives CSI for CSI feedback. EPRE indicates energy per RE. CSI-RS EPRE indicates energy per RE occupied by the CSI-RS and PDSCH EPRE denotes energy per RE occupied by a PDSCH.

The zero-power CSI-RS configuration list denotes CSI-RS pattern(s) in which the UE should assume zero transmission power. For example, since the eNB will transmit signals at zero transmission power on REs included in CSI-RS configurations indicated as zero transmission power in the zero power CSI-RS configuration list, the UE may assume signals received on the corresponding REs as interference or decode DL signals except for the signals received on the corresponding REs. The zero power CSI-RS configuration list may be a 16-bit bitmap corresponding one by one to 16 CSI-RS patterns for four antenna ports. In the 16-bit bitmap, the most significant bit corresponding to a CSI-RS configuration of the lowest CSI-RS configuration number (also called a CSI-RS configuration index) and subsequent bits correspond to CSI-RS patterns in an ascending order. The UE assumes zero transmission power with respect to REs of a CSI-RS pattern corresponding to bit(s) set to '1' in the 16-bit zero power CSI-RS bitmap configured by a higher layer. Hereinafter, a CSI-RS pattern in which the UE assumes zero transmission power will be referred to as a zero power CSI-RS pattern.

A zero power CSI-RS subframe configuration is information for specifying subframes including the zero power CSI-RS pattern. Like the CSI-RS subframe configuration, a subframe in which the zero power CSI-RS occurs may be configured for the UE using $I_{CSI-RS}$ according to Table 6. The UE may assume that subframes satisfying '$\{10n+\text{floor}(n_s/2)-\Delta_{CSI-RS}\}$ mod $T_{CSI-RS}=0$' include the zero power CSI-RS pattern. $I_{CSI-RS}$ may be separately configured with respect to a CSI-RA pattern in which the UE should assume non-zero transmission power and a zero power CSI-RS pattern in which the UE should assume zero transmission power, for REs.

The UE configured for a transmission mode (e.g. transmission mode 9 or other newly defined transmission modes) according to the 3GPP LTE-A system may perform channel measurement using a CSI-RS and demodulate or decode a PDSCH using a UE-RS.

Figure 8:
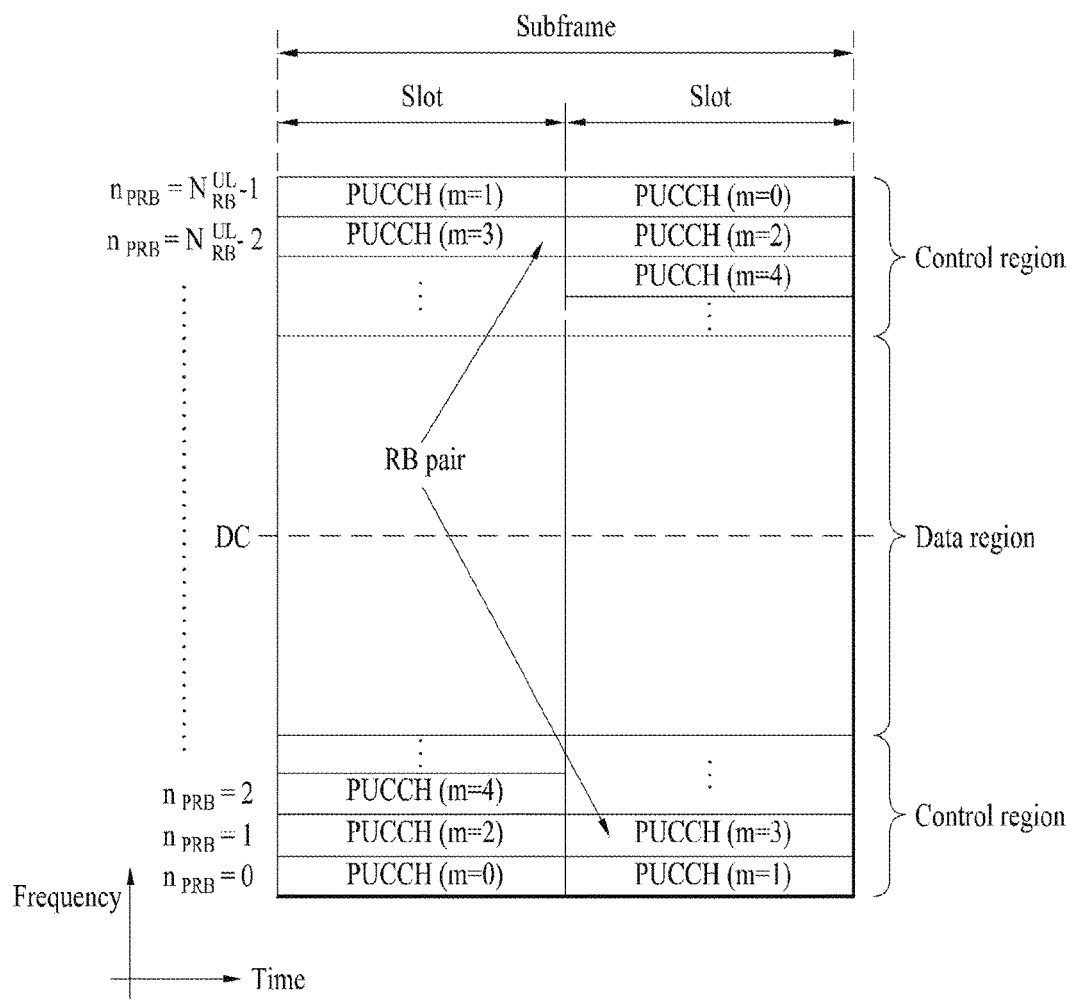
FIG. 8 illustrates the structure of a UL subframe used in a wireless communication system.

FIG. 8 illustrates the structure of a UL subframe used in a wireless communication system.

Referring to FIG. 8, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs in each of UL and DL are aggregated to support a BW of 60 MHz. The CCs may be contiguous or non-contiguous in the frequency domain. Although FIG. 5(b) illustrates that a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

A configured cell refers to a cell in which CA is performed for a UE based on measurement report from another eNB or UE among cells of an eNB and is configured for each UE.

The configured cell for the UE may be a serving cell in terms of the UE. The configured cell for the UE, i.e. the serving cell, pre-reserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell.

For reference, a carrier indicator (CI) means a serving cell index ServCellIndex and CI=0 is applied to a Pcell. The serving cell index is a short identity used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced.

The presence or absence of the CIF within the PDCCH may be semi-statically and UE-specifically (or UE-group-specifically) configured by higher layer signaling (e.g., RRC signaling).

Figure 9:
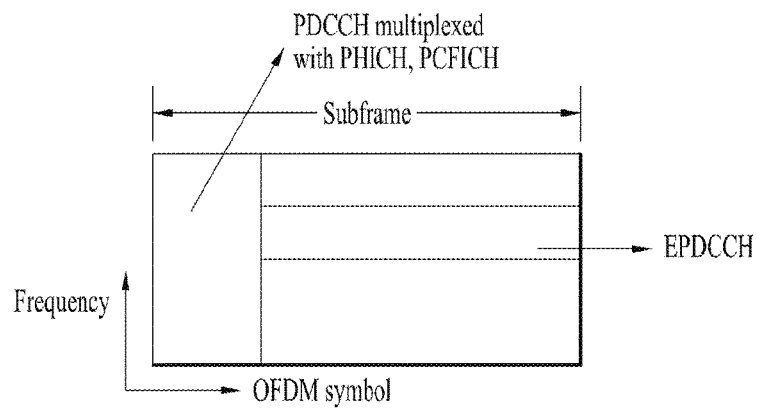
FIG. 9 is an example of a downlink control channel configured in a data region of a DL subframe.

FIG. 9 is an example of a downlink control channel configured in a data region of a DL subframe.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH)

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that (those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port $p \in \{107,108,109,110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE shall monitor a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

The UE does not monitor an EPDCCH in the following subframes:

in the case of TDD and a normal DL CP, special subframes for special subframe configurations 0 and 5 of Table 2;

in the case of TDD and an extended DL CP, subframes for special subframe configurations 0, 4 and 7 of Table 2;

subframes indicated to decode a physical multicast channel (PMCH) by higher layers; and special subframes corresponding to DL subframes on a Pcell when the UE is configured as UL/DL configurations for the Pcell and an Scell and the same DL subframes on the Scell when the UE cannot perform simultaneous transmission and reception on the Pcell and the Scell.

An EPDCCH UE-specific search space $ES^{(L)}_k$ at aggregation level $L \in \{1,2,4,8,16,32\}$ is defined by a set of EPDCCH candidates. For an EPDCCH-PRB-set p configured for distributed transmission, the ECCEs corresponding to EPDCCH candidate m of the search space $ES^{(L)}_k$ are given by the following table.

$$L\{(Y_{p,k}+m')\bmod \lfloor N_{ECCE,p,k}/L \rfloor\}+i \quad \text{Equation 1}$$

For an EPDCCH-PRB-set p configured for localised transmission, the ECCEs corresponding to EPDCCH candidate m of the search space $ES^{(L)}_k$ are given by the following table.

$$L\left\{\left(Y_{p,k}+\left\lfloor \frac{m \cdot N_{ECCE,p,k}}{L \cdot M_p^{(L)}} \right\rfloor+b\right)\bmod \lfloor N_{ECCE,p,k}/L \rfloor\right\}+i \quad \text{Equation 2}$$

where $i=0, \ldots, L-1$. $b=n_{CI}$ if the UE is configured with a carrier indicator field for the serving cell on which EPDCCH is monitored, otherwise $b=0$. $n_{CI}$ is the carrier indicator field (CIF) value, which is the same as a serving cell index (ServCellIndex). $m=0, 1, \ldots, M^{(L)}_p-1$, $M^{(L)}_p$ is the number of EPDCCH candidates to monitor at aggregation level L in EPDCCH-PRB-set p. The variable $Y_{p,k}$ is defined by '$Y_{p,k}=(A_p \cdot Y_{p,k-1})\bmod D$', where $Y_{p,k-1}=n_{RNTI}\neq 0$, $A_0=39827$, $A_0=39829$, $D=65537$ and $k=\text{floor}(n_s/2)$. $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter, EPDCCH DMRS) for demodulation of the EPDCCH, in a physical resource-block pair cyclically from 0 to 15 in an increasing order of first frequency. Therefore, all the REs, except REs carrying the EPDCCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by Table 7, the number of EREGs per ECCE is given by Table 8. Table 7 shows an example of supported EPDCCH formats, and Table 8 shows an example of the number of EREGs per ECCE, $N^{EREG}_{ECCE}$. Both localized and distributed transmission is supported.

TABLE 7

| | Number of ECCEs for one EPDCCH, $N^{ECCE}_{EPDCCH}$ | | | |
| --- | --- | --- | --- | --- |
| | Case A | | Case B | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 8

| | Normal cyclic prefix | | Extended cyclic prefix | |
| --- | --- | --- | --- | --- |
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

An EPDCCH can use either localized or distributed transmission, differing in the mapping of ECCEs to EREGs and PRB pairs. One or two sets of PRB pairs which a UE shall monitor for EPDCCH transmissions can be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k}-1$. ECCE number n is corresponding to the following EREG(s):

EREGs numbered $(n \bmod N^{ECCE}_{RB})+jN^{ECCE}_{RB}$ in PRB index floor$(n/N^{ECCE}_{RB})$ for localized mapping, and EREGs numbered floor $(n/N^{Sm}_{RB})+jN^{ECCE}_{RB}$ in PRB indices $(n+j\max(1,N^{SP}_{RB}/N^{EREG}_{ECCE}))\bmod N^{SP}_{RB}$ for distributed mapping, where $j=0, 1, \ldots, N^{EREG}_{ECCE}-1$, $N^{EREG}_{ECCE}$ is the number of EREGs per ECCE, and $N^{ECCE}_{RB}=16/N^{EREG}_{ECCE}$ is the number of ECCEs per RB pair. The PRB pairs constituting EPDCCH set $S_p$ are assumed to be numbered in ascending order from 0 to $N^{SP}_{RB}-1$.

Case A in Table 7 applies when:

DCI formats 2, 2A, 2B, 2C or 2D is used and $N^{DL}_{RB} \geq 25$, or any DCI format when $n_{EPDCCH}<104$ and normal cyclic prefix is used in normal subframes or special subframes with configuration 3, 4, 8.

Otherwise case 2 is used. The quantity $n_{EPPCCH}$ for a particular UE is defined as the number of downlink resource elements (k,l) in a PRB pair configured for possible EPDCCH transmission of EPDCCH set $S_0$ and and fulfilling all of the following criteria,

- they are part of any one of the 16 EREGs in the physical resource-block pair,
- they are assumed by the UE not to be used for CRSs or CSI-RSs,
- the index l in a subframe fulfils $l \geq l_{EPDCCHStart}$.

where $l_{EPCCHStart}$ is given based on higher layer signaling 'epdcch-StartSymbol-r11', higher layer signaling 'pdsch-Start-r11', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by TABLE 11 with $n'=n_{ECCE,low}$ mod $N^{ECCE}_{RB}+ n_{RNTI}$ mod min($N^{ECCE}_{EPDCCH}, N^{ECCE}_{RB}$), where $n_{ECCE,low}$ is the lowest ECCE index used by this EPDCCH transmission in the EPDCCH set, $n_{RTNI}$ corresponds to the RNTI associated with the EPDCCH transmission, and $N^{ECCE}_{EPDCCH}$ is the number of ECCEs used for this EPDCCH.

TABLE 9

| | Normal cyclic prefix | | |
|---|---|---|---|
| n' | Normal subframes, Special subframes, configurations 3, 4, 8 | Special subframes, configurations 1, 2, 6, 7, 9 | Extended cyclic prefix Any subframe |
| 0 | 107 | 107 | 107 |
| 1 | 108 | 109 | 108 |
| 2 | 109 | — | — |
| 3 | 110 | — | — |

For distributed transmission, each resource element in an EREG is associated with one out of two antenna ports in an alternating manner where $p \in \{107,109\}$ for normal cyclic prefix and $p \in \{107,108\}$ for extended cyclic prefix.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

Since embodiments of the present invention described hereinbelow relate to methods for coverage enhancement, the present invention may be applied not only to the MTC UE but also to other UEs having the coverage issue. Therefore, the embodiments of the present invention are applicable to a UE operating in a coverage enhancement mode. However, for convenience of description, a UE configured to implement a coverage enhancement method according to the present invention will be referred to as the MTC UE and a UE configured not to implement the coverage enhancement method according to the present invention will be referred to as a legacy UE.

Figure 10:
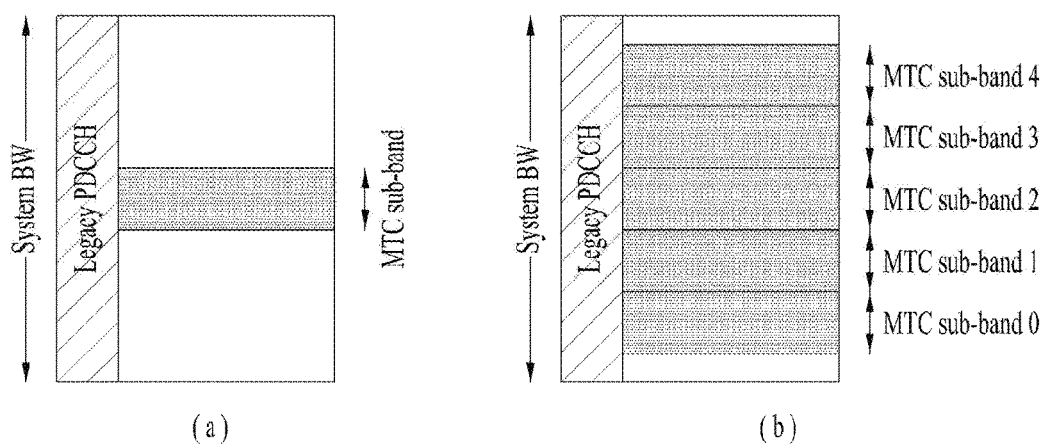
FIG. 10 illustrates an exemplary signal band for MTC.

FIG. 10 illustrates an exemplary signal band for MTC.

As one method of reducing the cost of an MTC UE, the MTC UE may operate in, for example, a reduced DL and UL bandwidths of 1.4 MHz regardless of the system bandwidth when the cell operates. In this case, a sub-band (i.e., narrowband) in which the MTC UE operates may always be positioned at the center of a cell (e.g., 6 center PRBs) as shown in FIG. 10(a), or multiple sub-bands for MTC may be provided in one subframe to multiplex MTC UEs in the subframe such that the UEs use different sub-bands or use the same sub-band which is not a sub-band consisting of the 6 center PRBs as shown in FIG. 10(b).

In this case, the MTC UE may not normally receive a legacy PDCCH transmitted through the entire system bandwidth, and therefore it may not be preferable to transmit a PDCCH for the MTC UE in an OFDM symbol region in which the legacy PDCCH is transmitted, due to an issue of multiplexing with a PDCCH transmitted for another UE. As one method to address this issue, introduction of a control channel transmitted in a sub-band in which MTC operates for the MTC UE is needed. As a DL control channel for such low-complexity MTC UE, a legacy EPDCCH may be used. Alternatively, an M-PDCCH, which is a variant of the legacy EPDCCH, may be introduced for the MTC UE. In the present invention described hereinbelow, the legacy EPDCCH or the M-PDCCH for a low-complexity or normal-complexity MTC UE will be referred to as an EPDCCH.

While a description of the present invention is given based on the assumption that a DL control channel proposed in the present invention is used for MTC UEs, the present invention is applicable even to the case in which the proposed DL control channel is used for normal UEs other than the MTC UEs.

The present invention proposes using the legacy EPDCCH or the EPDCCH of a modified type of the legacy EPDCCH, which may be used for a DL control channel of a low-complexity MTC UE operating through a reduced BW as illustrated particularly in FIG. 10.

If channel estimation/demodulation is performed using only a CRS rather than a DMRS for the purpose of receiving the EPDCCH (as opposed to the legacy EPDCCH), it should be expected that the UE can always receive the CRS in a subframe in which the EPDCCH is transmitted. Accordingly, in order to cause the EPDCCH to be transmitted in an MBSFN subframe, the UE should be capable of receiving the CRS or an RS having the same structure as the CRS in the MBSFN subframe. However, such an RS may be transmitted through a narrower BW than a legacy system BW. Therefore, in the present invention, the RS transmitted through a narrower BW than a system BW is referred to as a narrow-CRS. The narrow-CRS may be transmitted in subframes described below.

The narrow-CRS may be transmitted in a subframe in which the EPDCCH is transmitted to the UE among MBSFN subframes.

The narrow-CRS may be transmitted in a subframe in which the UE monitors the EPDCCH among the MBSFN subframes.

That is, although the narrow-CRS is transmitted identically to a legacy CRS, only a transmission region thereof may be restrictive. In the time domain, the narrow-CRS may be transmitted in a non-PDCCH transmission region and transmitted only through partial subframes rather than all DL subframes. In the frequency domain, the narrow-CRS may be transmitted through a narrower frequency resource region than the legacy CRS. The narrow-CRS may be transmitted for reception of an EPDCCH (and/or a PDSCH) by the UE in the MBSFN subframes. The frequency region in which the narrow-CRS is transmitted may be as follows.

The narrow-CRS may be transmitted through a reduced BW in which the UE operates. That is, the UE may assume that the narrow-CRS is transmitted through all frequency regions of the reduced BW in which the UE operates.

The narrow-CRS may be transmitted through a PRB region (i.e., a PRB resource position to which the EPDCCH can be mapped) corresponding to an EPDCCH-PRB-set for the EPDCCH of the UE. That is, the UE may assume that the narrow-CRS is transmitted in the PRB region (i.e., a PRB resource position to which the EPDCCH can be mapped) corresponding to the EPDCCH-PRB-set for the EPDCCH.

Since the narrow-CRS is not a CRS transmitted through all frequency bands, it is possible to transmit the narrow-CRS at a higher power than the legacy CRS. Therefore, the narrow-CRS may be boosted to a higher power than the legacy CRS during transmission and may be transmitted at a different power from the legacy CRS. Herein, transmission powers of narrow-CRSs may be kept constant. That is, although the narrow-CRS may be transmitted at a power different from the legacy CRS, narrow-CRSs may be transmitted at the same power. Alternatively, while a narrow-CRS is transmitted, the UE may not assume that the transmission power of the narrow-CRS is a specific relationship with the transmission power of the legacy CRS and/or with the transmission powers of narrow-CRSs in other subframes.

A. DMRS Transmission for Coverage Enhancement

In the case of the MTC UE that demands coverage enhancement, it is important to enhance channel estimation performance of the UE for an operation in a very low SNR region. In the low SNR region, the EPDCCH may have a limit to performance enhancement due to low capability of channel estimation even though the EPDCCH is repeatedly transmitted in numerous subframes. Accordingly, in a low-mobility environment of the UE, since a degree of channel variation over time is low, multiple-subframe (cross-subframe) channel estimation may be performed to enhance channel estimation performance.

To perform multi-subframe (cross-subframe) channel estimation, a DMRS should be consecutively transmitted at the same PRB position. Therefore, a DMRS transmitted through a partial frequency region for demodulation of the EPDCCH may be transmitted as follows. While, in the present invention, the DMRS is exemplarily described, the following description may be applied to all RSs transmitted through the partial frequency region for demodulation of the EPDCCH such as a narrow-CRS transmitted in an MBSFN subframe.

Figure 11:
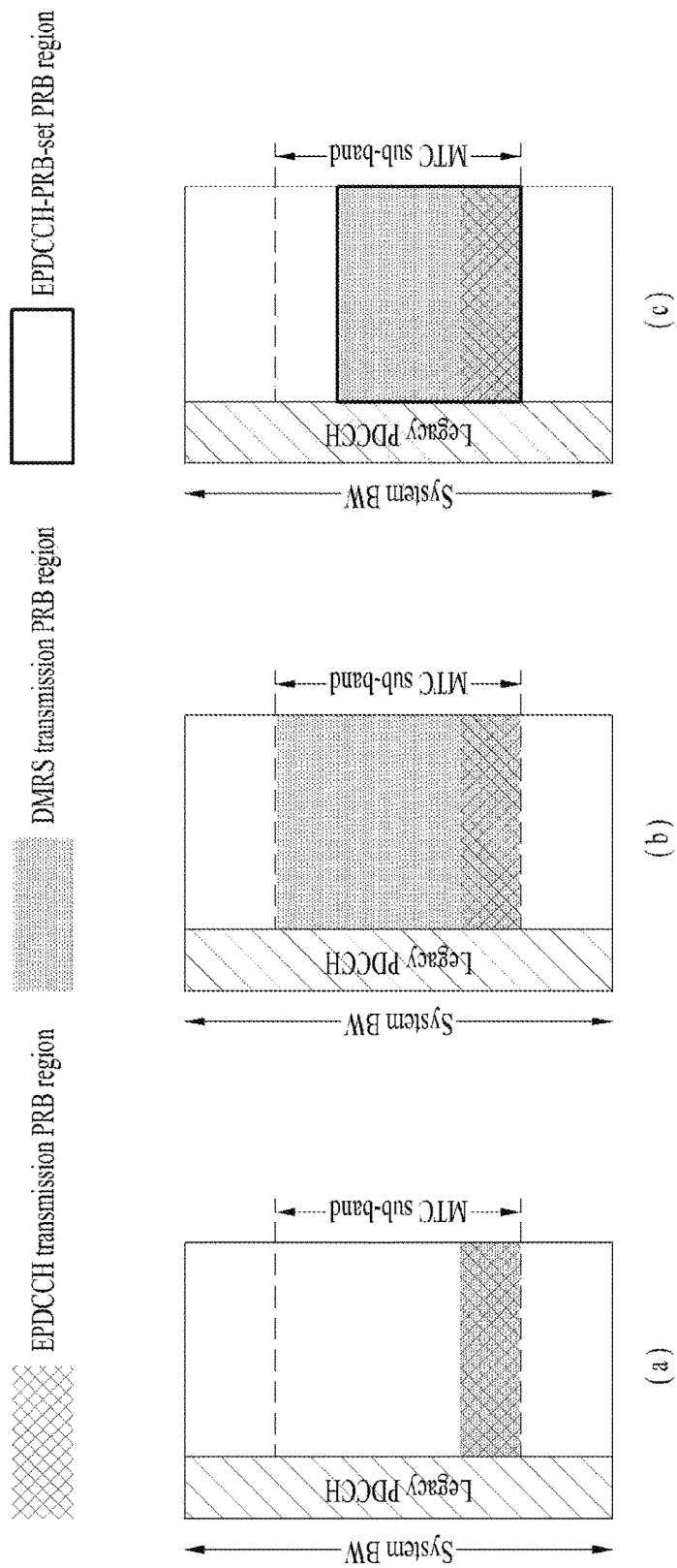
FIG. 11 illustrates examples of demodulation reference signal (DMRS) transmission according to the present invention.

FIG. 11 illustrates examples of DMRS transmission according to the present invention.

Alt 1) As illustrated in FIG. 11(a), the DMRS may be transmitted through a PRB region in which the EPDCCH is actually transmitted to the UE. While the EPDCCH is repeatedly transmitted in multiple subframes, if a PRB location at which the EPDCCH is transmitted is changed, a PRB location at which the DMRS is transmitted is also changed. If the PRB location at which the DMRS is transmitted is changed according to subframes, cross-subframe channel estimation, which is a scheme capable of raising channel estimation performance in a low-mobility environment, cannot be performed. Therefore, in order to perform cross-subframe channel estimation:

a) the EPDCCH should be transmitted at the same aggregation level while the EPDCCH is repeatedly transmitted, b) the EPDCCH should be transmitted through the same EPDCCH candidate while the EPDCCH is repeatedly transmitted, and c) an ECCE index constituting one EPDCCH candidate should be maintained while the EPDCCH is repeatedly transmitted or during a predetermined time duration.

Alt 2) As illustrated in FIG. 11(b), the DMRS may always be transmitted in a reduced BW region (e.g., 6 PRBs) in which a low-complexity MTC UE operates. That is, it is assumed in the part of the UE that the DMRS is transmitted over the entire region of the 6 PRBs in which the UE can perform a reception operation. In this case, as compared with Alt 1, since the amount of resources of the DMRS transmitted in one subframe increases, channel estimation performance in the subframe can be improved and the UE may also perform cross-subframe channel estimation. Characteristically, the DMRS may be transmitted only when the EPDCCH is actually transmitted to the UE.

Alt 3) As illustrated in FIG. 11(c), the DMRS may always be transmitted over the entire region of a PRB region constituting an EPDCCH-PRB-set. For example, if the EPDCCH-PRB-set consists of 4 PRBs, the DMRS may be transmitted in the 4 PRBs. In this case, the DMRS may be transmitted only when the EPDCCH is actually transmitted to the UE. Herein, in actuality, even when the EPDCCH is transmitted in only one PRB, since the DMRS is transmitted through more PRBs, channel estimation performance in a subframe can be improved and cross-subframe channel estimation may also be performed.

If the DMRS is transmitted as in Alt 2 or Alt 3, the DMRS is transmitted even in a PRB in which the EPDCCH is not actually transmitted to the UE. Herein, the EPDCCH of another UE may be transmitted through the PRB in which the EPDCCH of the UE is not transmitted. For this, the following consideration is given.

In the case of a localized EPDCCH, an antenna port through which the EPDCCH is to be transmitted to the UE is determined as follows. In this case, although it is desired that a transmission antenna port of the EPDCCH is determined by the following rules and the EPDCCH is transmitted to a specific UE, a DMRS for transmitting the EPDCCH may already have been transmitted to another UE through the same antenna port. For example, UE1 and UE2 may receive the EPDCCH in the same sub-band (reduced BW region) and, while the EPDCCH is transmitted, the DMRS may be transmitted as in Alt 3. In this case, the EPDCCH may be transmitted through PRB0 to UE1 and through PRB1 to UE2 and the DMRS may be transmitted through the entire region of 6 PRBs of the sub-band in which UE1 and UE2 operate. In order for UE1 and UE2 to be multiplexed and transmitted in the 6 PRBs of the sub-band, the EPDCCH/DMRS should be transmitted through different antenna ports. To this end, an embodiment of the present invention proposes, for the low-complexity MTC UE, that an antenna port be determined regardless of the lowest ECCE used by transmission of an EPDCCH in an EPDCCH set and the antenna port through which the EPDCCH/DMRS is to be transmitted be determined based on a UE ID. For example, the antenna port for transmitting the EPDCCH/DMRS may be determined according to $n_{RNTI}$ mod $N^{ECCE}_{RB}$. Alternatively, an embodiment of the present invention proposes that the antenna port be determined by "the lowest ECCE index used by the EPDCCH in the EPDCCH set", a UE ID, and/or "the lowest PRB index used by the EPDCCH (in the EPDCCH set)".

If the DMRS is transmitted as in Alt 2 or Alt 3, the DMRS is transmitted even in a PRB in which the EPDCCH is not actually transmitted to the UE. Herein, a PDSCH of the UE may be transmitted in the PRB in which the EPDCCH is not transmitted to the UE. In this case, for transmission of the EPDCCH, the DMRS which has been transmitted may be used to demodulate the PDSCH. That is, an embodiment of the present invention proposes that the UE commonly use the same DMRS for the purpose of demodulating the EPDCCH and the PDSCH in the same subframe. Herein, transmission of the EPDCCH and the EPDCCH DMRS is advantageous in that additional transmission of the DMRS is not needed to transmit the PDSCH. In order for the DMRS to be commonly used for the EPDCCH and the PDSCH, the UE may assume that the same precoding scheme is used to transmit the EPDCCH and the PDSCH.

B. Assignment of Weight Per Subframe

EPDCCH Demodulation/Channel Estimation

If EPDCCHs are (repeatedly) transmitted through multiple subframes, the UE may demodulate the EPDCCHs by combining the EPDCCHs transmitted through the multiple subframes. Herein, the UE may demodulate the EPDCCHs by assigning the same weight to all subframes in which the EPDCCHs are transmitted. Alternatively, the UE may demodulate the EPDCCHs by assigning different weights to the subframes in consideration of a channel state per subframe or transmission powers of the EPDCCHs.

To enhance channel estimation performance, EPDCCHs and RSs for demodulating the EPDCCHs (e.g., CRSs and DMRSs) may be transmitted through multiple subframes and channel estimation may be performed using the RSs transmitted through the multiple subframes. In this case, the UE may perform channel estimation by assigning the same weight to all subframes in which the EPDCCHs/RSs are transmitted. This means that the UE assumes that powers of EPDCCH DMRSs in all subframes in which the EPDCCHs are transmitted are uniform. Alternatively, the UE may perform channel estimation by assigning different weights to the subframes in consideration of a channel state in each subframe and transmission powers of the EPDCCHs/RSs.

For EPDCCH demodulation or multi-subframe (cross-subframe) channel estimation, different weights may be assigned to subframes according to a transmission power of an EPDCCH or an RS. To this end, the UE may measure an SINR in each subframe and apply different weights to subframes according to the measurement result. However, the MTC UE that operates in a low SINR environment and requires coverage enhancement may have a difficulty in accurately measuring the SINR in each subframe. Accordingly, an embodiment of the present invention proposes assigning a weight under the assumption by the UE that as much power boosting as a specific value has been performed in a specific subframe (as compared with other subframes) for transmission of an EPDCCH and/or an RS. Such a subframe in which the UE assumes that power boosting has been performed may be, for example, an MBSFN subframe. If a narrow-CRS is transmitted to demodulate the EPDCCH in the MBSFN subframe, the narrow-CRS may have a higher power than a normal CRS. Therefore, the UE may assume that as much power boosting as a specific value is always performed on the EPDCCH and/or the RS in the MBSFN subframe and the power-boosted EPDCCH and/or RS is transmitted.

How much power boosting has been performed in a specific subframe (e.g., MBSFN subframe) may be configured by an eNB to the UE through higher-layer signaling (e.g., RRC signaling). For example, a subframe index (or location) or a power boosting value (or index) on which power boosting is performed may be configured. In this case, the subframe index (or location) may be limited to some or all of the MBSFN subframe.

Radio Resource Management (RRM) Measurement

RRM serves to provide mechanisms for causing the UE and a network to manage seamless mobility without excessive user intervention by providing mobility experience to the UE, guaranteeing efficient use of available radio resources, and causing the eNB to satisfy predefined radio resource related requirements. To provide support for seamless mobility, the UE may perform procedures including cell search, measurements, handover, and cell reselection. The eNB may provide the UE with measurement configuration applicable to the UE, for RRM. For example, for RRM, the eNB transmits measurement configuration including a measurement object, reporting configuration, a measurement ID, quantity configuration, and a measurement gap to the UE so that the eNB may trigger measurement performed by the UE. The measurement object refers to an object that the UE should measure and may be, for example, a single E-UTRA carrier frequency for intra-frequency and inter-frequency measurement, a single UTRA frequency for inter-radio access technology (RAT) UTRA measurement, a set of GERAN carrier frequencies for inter-RAT GERAN measurement, and a set of cell(s) on a single carrier frequency for inter-RAT CDMA2000 measurement. Intra-frequency measurement refers to measurement on DL carrier frequency/frequencies of serving cell(s) and inter-frequency measurement refers to measurement on frequency/frequencies different from an arbitrary DL carrier frequency among DL carrier frequency/frequencies of serving cell(s). The reporting configuration refers to a list of reporting configurations and each reporting configuration is configured with a reporting criterion indicating a criterion for triggering transmission of measurement reporting of the UE, quantities that the UE should include for measurement reporting, and a reporting format indicating related information. The measurement ID refers to a list of measurement IDs and each measurement ID links one measurement object and one reporting configuration. By configuring a plurality of measurement IDs, it is possible to link one or more measurement objects to the same reporting configuration as well as one or more reporting configurations to the same measurement object. The measurement ID is used as a reference number in measurement reporting. The quantity configuration defines measurement quantities and related filtering, used for evaluation of all events and for related reporting of a measurement type. One filter may be configured per measurement quantity. The measurement gap indicates a period which can be used by the UE to perform measurement because no UL/DL transmission is scheduled. Upon receiving the measurement configuration, the UE measures reference signal received power (RSRP) and reference signal received quality (RSRQ) using a CRS on a carrier frequency indicated as the measurement object. A cell-specific signal strength metric is provided through RSRP measurement. RSRP measurement is mainly used to determine priority of candidate cells (or candidate CCs) according to signal strength or is used as input for handover and cell reselection determination. The RSRP is defined as a linear average of power distribution of REs carrying a CRS within a considered frequency BW with respect to a specific cell (or a specific CC). The RSRQ serves to provide a cell-specific signal quality metric and is mainly used to determine priority of candidate cells (or candidate CCs) according to signal quality, similar to the RSRP. The RSRQ may be used as input for handover and cell reselection when, for example, RSRP measurement cannot provide information sufficient to perform reliable mobility determination. The RSRQ is defined as "N*RSRP/RSSI", where N is the number of RBs of an RSSI measurement BW. A received signal strength indicator (RSSI) is defined as various types of powers including a total received wideband power, adjacent channel interference, thermal noise, etc., observed by the UE from all sources including co-channel serving and non-serving cells within a measurement BW. Therefore, the RSRQ may be the ratio of a pure RS power to a total power received by the UE.

In the present invention, when the UE performs RRM measurement or radio link monitoring (RLM) measurement based on the CRS, it is necessary to consider how to use a legacy CRS and a narrow-CRS to perform RRM/RLM measurement.

a) Even when the narrow-CRS is transmitted in a specific subframe, the UE may perform RRM/RLM measurement using only the legacy CRS;

b) When the narrow-CRS is transmitted, the UE may perform RRM/RLM measurement using only the narrow-CRS of a higher transmission power; or c) When the narrow-CRS is transmitted, the UE may perform RRM/RLM measurement using both the legacy CRS and the narrow-CRS. Among these methods, the method of c) will now be described in more detail.

When the UE performs RRM/RLM measurement using both the legacy CRS and the narrow-CRS, the narrow-CRS may be more power-boosted than the legacy CRS and then transmitted. Therefore, the UE may assign different weights to subframes according to transmission powers of the CRSs. The UE may perform RRM/RLM measurement by assigning a weight to the narrow-CRS relative to the legacy CRS under the assumption that the narrow-CRS is always power-boosted by a specific value. For example, upon performing RSRP measurement using legacy CRSs/narrow-CRSs transmitted in N subframes, the UE may measure RSRPs using the legacy CRSs or the narrow-CRSs in the respective subframes and then calculate a weighted average value of RSRPs measured in the N subframes. For example, if a weight assigned to a subframe i is $\alpha_i$ and an RSRP value measured in the subframe i is $RSRP_i$, a weighted average RSRP value may be as follows.

$$\frac{\sum_{i=0}^{N-1} \alpha_i RSRP_i}{\sum_{i=0}^{N-1} \alpha_i} \qquad \text{Equation 3}$$

For example, if narrow-CRSs are transmitted through two subframes (subframe 3 and subframe 4) of a total of 5 subframes and a weight value a is assigned to the two corresponding subframes (and a weight value 1 is assigned to the other subframes), a weighted average RSRP value may be equal to $(RSRP_0+RSRP_1+RSRP_2+\alpha RSRP_3+\alpha RSRP_4)/(3+2\alpha)$.

In order for the UE to determine which RS is used to perform RRM/RLM measurement, if RRM/RLM measurement is performed as in b) or c), indication information about an RS used for measurement may be configured by the eNB for the UE so that the UE may determine the RS used for measurement. Alternatively, if RRM/RLM measurement using the narrow-CRS is configured, the UE may perform RRM/PLM measurement using the narrow-CRS as in b) or c).

As another method, if the UE receives narrow-CRS transmission related configuration (e.g., presence/absence of the narrow-CRS, a subframe position at which the narrow-CRS is transmitted, and/or a power boosted degree of the narrow-CRS) from the eNB, the UE may assume that RRM/RLM measurement is performed using the narrow-CRS as in b) or c).

When the narrow-CRS is transmitted through an MBSFN subframe, the legacy CRS may be transmitted on two front OFDM symbols even in a subframe in which the narrow-CRS is transmitted. Therefore, upon performing RRM/RLM measurement using the narrow-CRS in the subframe in which the narrow-CRS is transmitted, the UE may perform measurement using only the narrow-CRS or using the legacy CRS transmitted on OFDM symbols 0 and 1 together with the narrow-CRS. Herein, upon performing RRM/RLM measurement using both the legacy CRS and the narrow-CRS, since power of the legacy CRS may differ from that of the narrow-CRS, the UE may perform RRM/RLM measurement by assigning different weights to the legacy CRS and the narrow-CRS.

CSI Measurement

If the narrow-CRS is transmitted in a specific subframe (e.g., MBSFN subframe), the (low-cost) MTC UE may perform CSI measurement through the legacy CRS and/or the narrow-CRS.

a) Even if the narrow-CRS is transmitted in a specific subframe, the UE may perform CSI measurement using only the legacy CRS;

b) When the narrow-CRS is transmitted, the UE may perform CSI measurement using only the narrow-CRS having a higher transmission power; or c) when the narrow-CRS is transmitted, the UE may perform CSI measurement using both the legacy CRS and the narrow-CRS.

The method of b) will now be described in more detail. If the UE performs CSI measurement using only the narrow-CRS transmitted through MBSFN subframes, valid DL subframes for CSI measurement may be modified to be limited to all or some of the MBSFN subframes in which the narrow-CRS is transmitted. In this case, if the narrow-CRS is transmitted to all of the MBSFN subframes, the valid DL subframes may be all of the MBSFN subframes. Valid subframes in a serving cell may be DL subframes configured as the MBSFN subframes in which the narrow-CRS is transmitted. Alternatively, the valid subframes in the serving cell may be, for example, the MBSFN subframes in which the narrow-CRS is transmitted. Alternatively, the valid subframes in the serving cell may be MBSFN subframes (or a subframe other than a non-MBSFN subframe). That is, while the legacy UE may perform CSI measurement using only the legacy CRS, the (low-cost) MTC UE may perform CSI measurement using the narrow-CRS transmitted through the MBSFN subframes.

If the (low-complexity) MTC UE performs CSI measurement using only the narrow-CRS, the UE may make all or some of the following assumptions in a CSI reference resource.

Measurement is performed on the (above-described) narrow-CRS REs.

While the CRS REs are identical to CRS REs of a non-MB SFN subframe, locations of REs transmitted on OFDM symbols 0 and 1 may be excluded.

The method of c) will now be described in more detail. If the (low-cost) MTC UE performs CSI measurement using a narrow-CRS transmitted through an MBSFN subframe as well as a CRS transmitted through a non-MB SFN subframe, valid DL subframes for CSI measurement may be modified to include MBSFN subframes in which the narrow-CRS is transmitted. In this case, if the narrow-CRS is transmitted in all of the MBSFN subframes, all of the MBSFN subframes may be included in the valid DL subframes. For example, the valid subframes may MBSFN subframes in which the narrow-CRS is not transmitted. That is, although the legacy UE may perform CSI measurement using only the legacy CRS, the (low-cost) MTC UE may perform CSI measurement using both the narrow-CRS transmitted in the MBSFN subframe and the legacy CRS.

If the (low-complexity) MTC UE performs CSI measurement using only the narrow-CRS, the UE may make all or some of the following assumptions in a CSI reference resource.

Measurement is performed on the (above-described) narrow-CRS REs.

While the CRS REs may be identical to CRS REs of a non-MB SFN subframe, locations of REs transmitted on OFDM symbols 0 and 1 may be excluded.

It is assumed in a non-MB SFN subframe that CRS REs of the non-MB SFN subframe will be used and it is assumed in an MBSFN subframe (in which the narrow-CRS is transmitted) that the narrow-CRS REs will be used.

While it is assumed in the non-MBSFN subframe that the CRS REs of the non-MBSFN subframe will be used and it is assumed in the MBSFN (in which the narrow-CRS is transmitted) that CRS REs of the non-MB SFN subframe will be used, locations of REs transmitted on OFDM symbols 0 and 1 may be excluded.

C. EPDCCH Transmission Resource During Repetition

To perform multiple-subframe (cross-subframe) channel estimation, a DMRS should be consecutively transmitted at the same PRB position. However, the DMRS transmitted for demodulating an EPDCCH may be transmitted in a PRB region in which the EPDCCH is actually transmitted to the UE. Accordingly, to perform cross-subframe channel estimation, the EPDCCH should be transmitted on the same PRB resource during repetition. Therefore, the EPDCCH may be transmitted at the same aggregation level during repetition and transmitted through the same EPDCCH candidate, and an ECCE location constituting one EPDCCH candidate may be maintained during EPDCCH repetition or a predetermined time period. For example, assuming that the ECCE index constituting one EPDCCH candidate is determined according to Equation 2, $Y_{p,k}$ in Equation 2 should be maintained without change during EPDCCH repetition or during a predetermined time period. In this case, for example, when the EPDCCH is transmitted through multiple subframes, the UE may assume that subframe number k in Equation 2 is a subframe number of the first subframe in which the EPDCCH is transmitted or that $n_s$ in k=floor($n_s$/2) is a slot number of the first slot in which the EPDCCH is transmitted. Alternatively, assuming that a set of EPDCCHs repeatedly transmitted in multiple subframes is an EPDCCH bundle, the value of k may be determined by a radio frame index to which the first subframe in which the EPDCCH is transmitted belongs, in consideration of the case in which transmission of the EPDCCH bundle is started only at a specific time point as in a subframe corresponding to "subframe index modulo 10=0". For example, the value of k may be assumed to be a value corresponding to a radio frame index or "radio frame index modulo 10".

Figure 12:
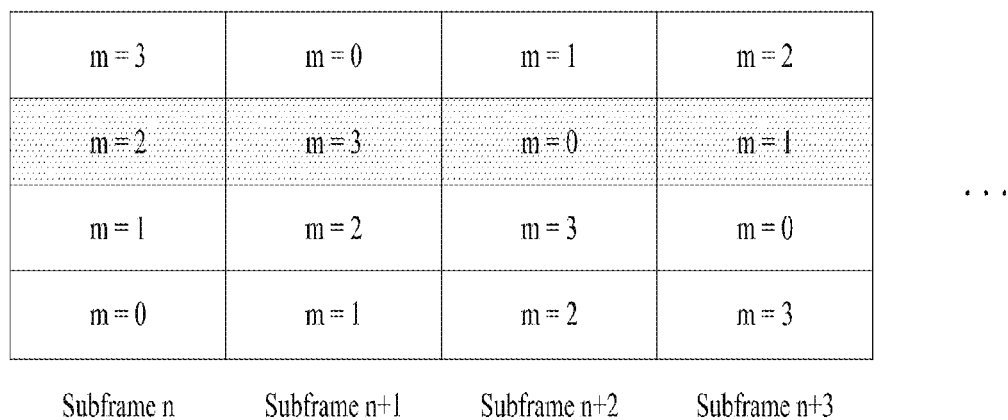
FIG. 12 illustrates an enhanced physical downlink control channel (EPDCCH) transmission resource according to an embodiment of the present invention.

FIG. 12 illustrates an EPDCCH transmission resource according to an embodiment of the present invention.

The EPDCCH may be transmitted through the same PRB resource during EPDCCH repetition by varying, in each subframe, an index of an EPDCCH candidate on which the EPDCCH is transmitted, without changing definition (or Equation 2) of an ECCE location constituting one EPDCCH candidate. That is, when the EPDCCH is repeatedly transmitted through multiple subframes, the EPDCCH may be transmitted through an EPDCCH candidate consisting of the same ECCE resource(s) as those constituting an EPDCCH candidate transmitted in the first subframe. For example, as in FIG. 12, when the EPDCCH is repeatedly transmitted through multiple subframes starting from subframe n, an EPDCCH candidate index m on which the EPDCCH is transmitted in each subframe may be transmitted through an EPDCCH candidate configured through the same ECCE resource (i.e., the same physical resource) as an EPDCCH candidate on which the EPDCCH is transmitted in subframe n. Referring to FIG. 12, while the EPDCCH is transmitted through EPDCCH candidate 2 in subframe n, the EPDCCH may be transmitted in subframe n+1, n+2, and n+3 through EPDCCH candidates 3, 0, and 1, respectively, that use the same physical resource as that in subframe n.

An aggregation level (AL) at which the UE is to perform monitoring in a specific subframe and the number of EPDCCH candidates may differ according to which of Case 1, Case 2, or Case 3 a subframe belongs.

Case 1 applies:
  for normal subframes and normal downlink CP when DCI formats 2/2A/2B/2C/2D are monitored and, or
  for special subframes with special subframe configuration 3, 4, 8 and normal downlink CP when DCI formats 2/2A/2B/2C/2D are monitored, or
  for normal subframes and normal downlink CP when DCI formats 1A/1B/1D/1/2/2A/2B/2C/2D/0/4 are monitored, and when $n_{EPDCCH}<104$, or
  for special subframes with special subframe configuration 3, 4, 8 and normal downlink CP when DCI formats 1A/1B/1D/1/2A/2/2B/2C/2D/0/4 are monitored, and when $n_{EPDCCH}<104$;

Case 2 applies:
for normal subframes and extended downlink CP when DCI formats 1A/1B/1D/1/2A/2/2B/2C/2D/0/4 are monitored, or
for special subframes with special subframe configuration 1, 2, 6, 7, 9 and normal downlink CP when DCI formats 1A/1B/1D/1/2A/2/2B/2C/2D/0/4 are monitored, or
for special subframes with special subframe configuration 1, 2, 3, 5, 6 and extended downlink CP when DCI formats 1A/1B/1D/1/2A/2/2B/2C/2D/0/4 are monitored;
otherwise,
Case 3 is applied.

If conditions correspond to Case 1, Case A of Table 7 is used and, otherwise, Case B of Table 7 is used.

If a case to which a subframe belongs is changed while the EPDCCH is repeatedly transmitted in multiple subframes, ALs at which the UE can perform monitoring and the number of EPDCCH candidates per AL may be changed. In this case, an AL and/or an EPDCCH candidate through which the EPDCCH is transmitted in the first subframe in which an EPDCCH bundle is transmitted may not be present in a specific subframe. Therefore, an embodiment of the present invention proposes that, when an EPDCCH used in the first subframe in which an EPDCCH bundle is transmitted is transmitted using an X-th AL and a Y-th EPDCCH candidate in the X-th AL among ALs and EPDCCH candidates in the ALs, through which the UE can perform monitoring, the EPDCCH be transmitted using the X-th AL and the Y-th EPDCCH candidate in the X-th AL among ALs and EPDCCH candidates in the ALs, through which the UE can perform monitoring in each subframe, even in other subframes in which the EPDCCH bundle is transmitted.

In legacy EPDCCH, number of EREGs composing an ECCE is 4 or 8 depends on CP length and special subframe configuration. Also, supported ALs and the number of decoding candidates per AL can be different depending on number of REs per PRB which are available to transmit EPDCCH and the length of DCI.

In summary, following subframes have ECCEs consisting of 4 EREGs but support different ALs compared to normal case (i.e., normal subframe with normal CP).
Case 1: Special subframes with special subframe configuration 3, 4, 8 and normal CP In addition, following subframes have ECCE consisting of 8 EREGs and support different ALs compared to normal case:
Case 2-1: Special subframes with special subframe configuration 1, 2, 6, 7, 9 and normal CP,
Case 2-2: Normal subframes and extended CP,
Case 2-3: Special subframes with special subframe configuration 1, 2, 3, 5, 6 and extended CP.

Subframes in Case 1 has same number of ECCEs (e.g., 16 ECCEs in a PRB-set with 4 PRBs) compared to normal case. Since we think same subset of L and the number of decoding candidates per L is monitored regardless of subframe, Case 1 does not have any issue.

However, subframes in Case 2-1 has only 8 ECCEs in a PRB-set with 4 PRBs compared to normal case. Then, when an EPDCCH bundle is transmitted using same ECCE resources during repetition, it can be happened that subframes in Case 2-1 do not have ECCE(s) for EPDCCH transmission. To resolve this issue, the following three solutions can be considered:
Option (a): EPDCCH is not transmitted if all or a part of ECCE(s) does not exist in subframes in Case 2-1;
Option (b): EPDCCH is transmitted using available ECCEs in subframes in Case 2-1; or
Option (c): An ECCE consists of 4 EREGs in Case 2-1.

Among Option (a), Option (b) and Option (c), Option (c) is preferred since all candidates can utilize resources in subframes in Case 2-1. If Option (a) or Option (b) is adopted, subframes in Case 2-1 should be counted for repetitions even if these subframes are not utilized for EPDCCH transmission. Actually, even a subframe not used for EPDCCH repetition is included when the number of EPDCCH repetitions is counted.

For normal and special subframe with extended CP (Case 2-2 and 2-3), an ECCE consists of 8 EREGs. In this case, supported ALs for EPDCCH can be {1, 2, 4, 8, 12} and all subframes can have same number of ECCEs in a PRB-set. Therefore, we don't see any issue for extended CP.

Accordingly, an embodiment of the present invention proposes configuring an ECCE including 4 EREGs for normal and special subframes with a normal CP and configuring an ECCE including 8 EREGs for normal and special subframes with an extended CP. In addition, an embodiment of the present invention proposes configuring the same AL L, the same number R of EPDCCH repetitions, and the same number of decoding candidates (i.e., EPDCCH candidates) for normal and special subframes, regardless of special subframe configuration.

D. Scrambling Sequence

In a legacy EPDCCH, a block $b(0), \ldots, b(M^{(0)}_{bit}-1)$ of bits to be transmitted on the EPDCCH in a subframe becomes a block $\tilde{b}(0), \ldots, \tilde{b}(M_{bit}-1)$ of scrambled bits according to the following equation.

$$\tilde{b}(i)=(b(i)+c(i)) \bmod 2 \qquad \text{Equation 4}$$

where the scrambling sequence c(i) is given by the following equation.

$$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \qquad \text{Equation 5}$$

where $N_C=1600$ and the first m-sequence is initialized with $x_1(0)=1$, $x_1(n)=0$, n=1, 2, ..., 30. The initialization of the second m-sequence is denoted by the following equation $$c_{init}=\Sigma_{i=0}^{30} x_2(i) \cdot 2^i \qquad \text{Equation 6}$$

In Equation 4, the scrambling sequence generator shall be initialized with the following equation.

$$c_{init}=\lfloor n_s/2 \rfloor \cdot 2^9 + n_{ID,m}^{EPDCCH} \qquad \text{Equation 7}$$

where m is the EPDCCH set number.

Referring to Equation 7, a scrambling sequence differs according to a slot number (or subframe number) on which the EPDCCH is transmitted. If the scrambling sequence is initialized according to Equation 7, when the EPDCCH is repeatedly transmitted through multiple subframes, the scrambling sequence applied to the EPDCCH differs according to each subframe in which the EPDCCH bundle is transmitted.

However, in order to perform low-complexity decoding using EPDCCHs transmitted through multiple subframes, the UE may perform the demodulation process after adding values of modulation symbols of the EPDCCHs transmitted through the respective subframes prior to performing demodulation. In order for the UE to perform demodulation after adding the values of modulation symbols of the EPDCCHs in multiple subframes, values of scrambling sequences applied to the subframes should be equal.

To configure the sequences of the EPDCCHs transmitted in multiple subframes to be equal in the subframes, a scrambling sequence applied to each subframe may be configured such that a scrambling sequence applied to the first subframe in which an EPDCCH bundle is transmitted is identically applied to the other subframe(s). Alternatively, when EPDCCHs are transmitted through multiple subframes, the UE may apply, instead of $n_s$ in Equation 7, a slot number of the first slot in which an EPDCCH is transmitted or apply, instead of floor($n_s/2$), a subframe number of the first subframe in which the EPDCCH is transmitted.

Alternatively, in order to configure sequences of the EPDCCHs transmitted in multiple subframes to be equal, $c_{init}$ may be defined as a value determined by a UE ID (e.g., C-RNTI). Herein, the value of $c_{init}$ may be irrelevant to subframe/slot locations at which the EPDCCHs are transmitted. Alternatively, the value of $c_{init}$ may be a value determined by the first subframe/slot in which the EPDCCH bundle is transmitted.

In summary, scrambling sequences of a legacy EPDCCH vary according to subframes. However, in an embodiment of the present invention, scrambling sequences for an EPDCCH are identical with respect to Z subframes. Herein, Z=1 for no or small repetitions and Z>1 for medium/large repetitions.

E. EPDCCH PRB Bundling

For an MTC UE that transmits the EPDCCH in each of multiple subframes through repetition, it is necessary to enhance channel estimation performance in order to reduce the number of EPDCCH repetitions. Herein, PRB bundling may be used to enhance channel estimation performance of the EPDCCH. PRB bundling refers to a scheme of causing the UE to estimate channel states of neighbor PRBs under the assumption that the same precoder is applied to DMRSs in the neighbor PRBs.

The EPDCCH may be transmitting using all or some PRBs in an EPDCCH-PRB-set according to transmission type (e.g., localized or distribution transmission) and/or an AL. In this case, a DMRS capable of performing channel estimation for the EPDCCH is transmitted only in PRB(s) in which the EPDCCH is actually transmitted. The present invention provides a PRB region and a PRB size in which the UE performs PRB bundling to receive the EPDCCH.

Method 1. The UE may perform PRB bundling for channel estimation using all of a PRB region in which the EPDCCH is transmitted. For example, if an EPDCCH-PRB-set region is PRBs 0, 1, 2, 3, 4, and 5 and the EPDCCH is transmitted through PRBs 4 and 5, the UE may perform channel estimation by bundling PRBs 4 and 5. Method 1 may be an option used when a coverage class of the UE is high or when an EPDCCH AL is set to one or a limited number.

Method 2. The UE may perform channel estimation by dividing a narrowband in which the EPDCCH is transmitted into size-N PRB groups and bundling PRBs in the same PRB group among PRBs in which the EPDCCH is transmitted. For example, upon dividing a narrowband of 6 PRBs into two PRB groups each having a size of 3 PRBs (e.g., group 1: PRBs 0, 1, and 2 and group 2: PRBs 3, 4, and 5), if the EPDCCH is transmitted through PRBs 1, 2, 3, and 4, the UE may perform channel estimation by bundling PRBs, i.e., PRBs 1 and 2, belonging to the same PRB group and perform channel estimation by bundling PRBs, i.e., PRBs 3 and 4, belonging to the same PRB group. In this case, the size of a PRB group and/or the locations of PRBs constituting each PRB group may be predefined or may be configured through higher layer signaling from the eNB.

Method 3. The UE may perform channel estimation by dividing the EPDCCH-PRB-set into size-N PRB groups and bundling PRBs in the same PRB group among PRBs in which the EPDCCH is transmitted. For example, if the EPDCCH-PRB-set of 4 PRBs is divided into two PRB groups each having a size of 2 PRBs (e.g., group 1: PRBs 0 and 1 and group 2: PRBs 2 and 3) and the EPDCCH is transmitted through PRBs 1, 2, 3, and 4, the UE may perform channel estimation by bundling PRBs, i.e., PRBs 0 and 1, belonging to the same PRB group and perform channel estimation by bundling PRBs, i.e., PRBs 2 and 3, belonging to the same PRB group. In this case, the size of a PRB group and/or the locations of PRBs constituting each PRB group may be predefined or may be configured through higher layer signaling from the eNB.

Method 4. Since PRB bundling of the EPDCCH is more effective when coverage enhancement of a high level is needed, PRB bundling may be performed only with respect to the EPDCCH of an AL 24 which will mainly be used to reduce the number of repetitions in a coverage enhancement environment. In this case, the size of PRB bundling of the EPDCCH may always be assumed to be a specific number of PRBs (e.g., 6 PRBs) or may be configured through higher layer signaling or an SIB from the eNB. Alternatively, PRB bundling may be performed only with respect to the EPDCCH of an AL of a specific value or more. Herein, a minimum value of the AL capable of performing PRB bundling may be predefined or may be configured through an SIB or higher layer signaling from the eNB. In addition, the size of PRB bundling may be predefined or may be configured through higher layer signaling or the SIB from the eNB.

Method 5. Since PRB bundling of the EPDCCH is more effective when coverage enhancement of a high level is needed, PRB bundling may be performed only with respect to an EPDCCH-PRB-set having a size of 6 PRBs which will mainly be used to reduce the number of repetitions in a coverage enhancement environment. In this case, the UE may assume that PRB bundling is applied only to ALs exceeding AL 2 or AL 4 at which the EPDCCH is transmitted through all 6 PRBs in a distributed transmission environment. In this case, the size of PRB bundling of the EPDCCH may always be assumed to be PRBs having a specific number (e.g., 6 PRBs) or may be a value configured through higher layer signaling or the SIB from the eNB.

Method 6. Since the EPDCCH is transmitted through a plurality of PRBs at AL 8 or more in a localized transmission environment, it may be assumed that EPDCCH PRB bundling is applied only to ALs exceeding AL 8. Alternatively, only ALs exceeding AL 8 may be supported in a coverage enhancement environment to which PRB bundling is applied. In this case, the size of PRB bundling may always be fixed to a specific value (e.g., two PRBs). Alternatively, the size of PRB bundling may be configured through higher layer signaling or the SIB from the eNB.

Method 7. When the size of a PRB-set is 2 or 4 in a distributed transmission environment, PRB bundling may be applied regardless of an AL. In this case, the size of PRB bundling (i.e., the size of a PRB group (PRG)) of the EPDCCH may always be assumed to be a specific number of PRBs (e.g., 6 PRBs) or may be configured through higher-layer signaling or the SIB from the eNB. Meanwhile, when a PRB-set size is 6 in the distributed transmission environment, PRB bundling may be applied only when an AL is 2 or more. In this case, the size of PRB bundling of the EPDCCH may always be assumed to be a specific number of PRBs (e.g., 6 PRBs) or may be configured through higher layer signaling or the SIB from the eNB. Alternatively, a specific value of the size of PRB bundling (i.e., the size of the PRG) may always be assumed and, to this end, the EPDCCH may be transmitted through AL 2 or more.

Method 8. The UE may assume that PRB bundling of PRB size=2 is applied only to EPDCCH candidates having AL 8 or more. Alternatively, the UE may assume that PRB bundling of PRG size=2 is applied only to EPDCCH candidates of AL 8 or more in the localized transmission environment and assume that PRB bundling of PRG size=2 (or 3 or 6) is applied only to EPDCCH candidates of AL 2 or more in the distribution transmission environment.

One of the above methods or a combination of the above methods may be used according to an AL configured for the UE, a repetition level, and/or PRB configuration. For example, when one AL is configured, Method 1 in which bundling is used only in PRBs to which the EPDCCH is mapped. As an example, the following configuration may be considered.

TABLE 10

| | Case in which all ALs are mapped to all PRB sets | Case in which not all ALs are mapped to all PRB sets |
|---|---|---|
| Configuration of one AL | A fixed PRB bundling size may be assumed. The bundled size may be assumed to be the same as a PRB set size or higher layer configuration may be assumed. | Bundling may be assumed in RBs mapped according to AL. Alternatively, a fixed PRB bundle size may be assumed. The fixed PRB bundling size may differ according to AL. For example, 2 PRBs for AL = 8, 4 PRBs for AL = 16, and 6 PRBs for AL = 24 may be assumed. |
| Configuration of ALs of more than one | A fixed PRB bundling size may be assumed. The bundled size may be assumed to be the same as a PRB set size or higher layer configuration may be assumed. | The fixed size may be assumed to be applied only to the largest AL. |

PRB bundling may be applied to all configured ALs or only to the largest AL.

PRB bundling may be applied to all configured PRB sets or fewer PRB sets than the configured PRB sets. The PRB size may be designated through a configured AL or higher layer signaling.

PRB bundling may be enabled when a configured coverage level is greater than a predetermined level or more and disabled when the configured coverage level is less than the predetermined level. Alternatively, PRB bundling may be disabled according to a configured AL set. PRB bundling may be applied when only one AL is applied. Alternatively, PRB bundling may be applied only when a configured EPDCCH set is a localized case or only when the configured EPDCCH set is a distributed case.

F. EPDCCH Transmission Subframes and Collision Issue

Special Subframe

Special subframes with special subframe configuration 0 and 5 in normal CP and special subframes with special subframe configuration 0, 4, and 7 in extended CP are not utilized for EPDCCH transmission. However, if these subframes are configured as subframes available for DL transmission through an SIB for MTC (hereinafter, MTC-SIB), the subframes are also included when the number of EPDCCH repetitions is counted. This example may be identically applied even to a PDSCH.

CSI-RS

Unlike to EPDCCH transmission, EPDCCH can be transmitted before CSI-RS configuration is signaled to UE. Then, CSI-RS can be transmitted in EPDCCH transmitting subframes. In this case, since a UE does not know CSI-RS configuration, EPDCCH transmission can be punctured in CSI-RS REs. Accordingly, according to an embodiment of the present invention, the UE may assume that RE mapping of the EPDCCH is equal regardless of CSI-RS configuration. After CSI-RS configuration is acquired, the EPDCCH may be rate-matched as EPDCCH RE mapping on CSI-RS REs.

According to an embodiment of the present invention, before the UE receives CSI-RS configuration, the EPDCCH is punctured on CSI-RS REs and, after the UE receives CSI-RS REs, the EPDCCH is rate-matched on the CSI-RS REs.

The embodiments of the present invention may be identically applied to PDSCH transmission.

PSS/SSS/PBCH

In a legacy EPDCCH, if an ECCE corresponding to an EPDCCH candidate is mapped to a PRB pair overlapping with PSS, SSS or PBCH transmission in frequency in the same subframe, it is not expected that the UE monitors the EPDCCH candidate.

A narrowband can be overlapped with PRBs for PSS/SSS/PBCH transmission. Then collision between EPDCCH and PSS/SSS/PBCH can be happened. There can be two options to solve this collision issue.

Option (a): A EPDCCH candidate is not monitored if an ECCE corresponding to that EPDCCH candidate is mapped to a PRB pair that overlaps in frequency with a transmission of PSS, SSS, or PBCH in the same subframe.

Option (b): EPDCCH is rate-matched in PRB pair that overlaps in frequency with a transmission of PSS, SSS, or PBCH in the same subframe.

Compared with Option (a), Option (b) may use a PRB resource which does not overlap with a PRB pair for PSS, SSS, or PBCH transmission. If Option (a) is adopted, since an EPDCCH of an AL of L=24 cannot be transmitted in subframes for PSS, SSS, or PBCH transmission, option (a) may cause performance degradation in terms of coverage enhancement. In addition, even if the EPDCCH is not transmitted in subframes for PSS/SSS/PBCH transmission, these subframes may be counted for EPDCCH repetitions. Therefore, an embodiment of the present invention proposes that the EPDCCH be rate-matched in a PRB pair overlapping with PSS, SSS, or PBCH transmission in frequency in the same subframe.

PDSCH

In the case of legacy EPDCCH and associated PDSCH transmission in a subframe, a PDSCH is not mapped to any PRB(s) carrying an EPDCCH associated with the PDSCH.

Figure 13:
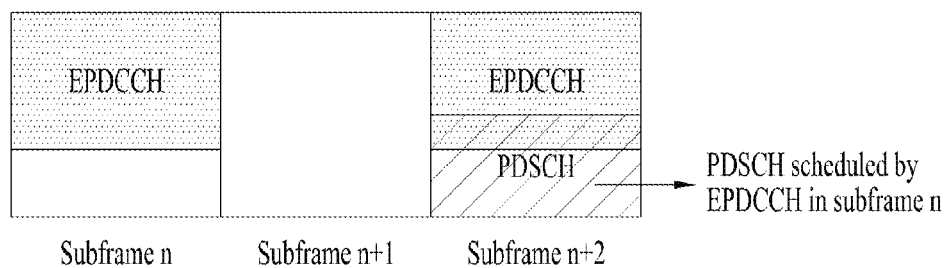
FIG. 13 illustrates an example of collision between a control channel and a data channel unassociated with the control channel according to an embodiment of the present invention.

FIG. 13 illustrates an example of collision between a control channel and a data channel unassociated with the control channel according to an embodiment of the present invention.

If cross-subframe scheduling is supported for MTC UEs, multiplexing of an EPDCCH for MTC and an unassociated PDSCH may be supported in the same subframe for an MTC UE that is not operating for coverage enhancement.

This method may be extended to UEs in coverage enhancement (CE) mode A among CE mode A and CE mode B. Two CE modes, mode A and mode B, are configured for RRC connected (RRC_CONNECTED) UEs. CE mode A describes a set of behaviors for no repetitions and small repetitions and CE mode B describes a set of behaviors for large repetitions. The CE modes are signaled to the UE and the UE monitors different DCI according to CE mode.

In CE mode A, a collision issue arises between an EPDCCH and a PDSCH scheduled by the EPDCCH as illustrated in FIG. 13. Since the PDSCH is scheduled prior to monitoring the EPDCCH in subframe n+2, reception of the PDSCH should precede reception of the EPDCCH. In this case, two solutions may be considered.

Option (c): A EPDCCH candidate is not monitored if an ECCE corresponding to that EPDCCH candidate is mapped to a PRB pair for transmission of un-associated PDSCH in the same subframe.

Option (d): M-PDCCH is rate-matched in PRB pair for transmission of un-associated PDSCH in the same subframe.

To utilize more resources for EPDCCH transmission, Option (d) is desirable.

For UEs of CE mode B, 1) an EPDCCH and an unassociated PDSCH may not be multiplexed in a subframe so that a UE may not need to monitor the EPDCCH during PDSCH reception, or 2) Multiplexing of the EPDCCH and the unassociated PDSCH is supported in the same subframe for the same UE and Option (d) may be applied.

Even when the EPDCCH is not transmitted in some subframes due to collision with the PDSCH, these subframes are included in the number of the EPDCCH repetitions and counted.

SIB Subframe

Figure 14:
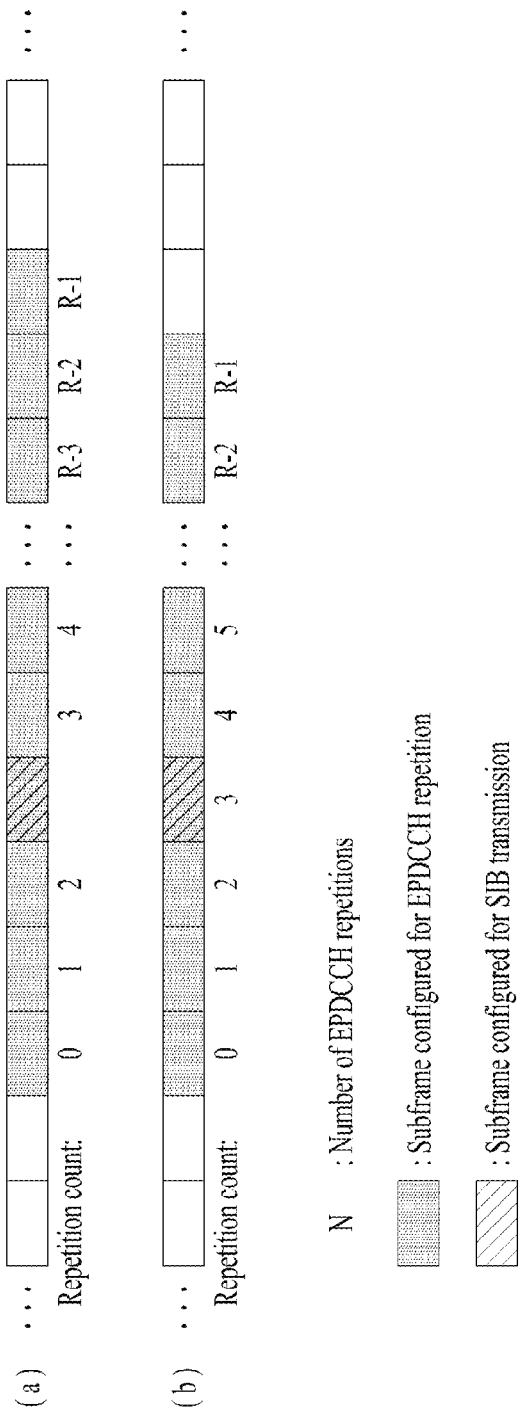
FIG. 14 illustrates the number of control channel transmission repetitions according to an embodiment of the present invention.

FIG. 14 illustrates the number of control channel transmission repetitions according to an embodiment of the present invention.

If a narrowband for EPDCCH monitoring is equal to a narrowband for MTC SIB transmission and an MTC SIB is transmitted always using 6 PRBs, the EPDCCH and the MTC SIB cannot be transmitted in the same subframe. In this case, if the number of EPDCCH repetitions is 1 (i.e., R=1), the UE does not need to monitor the EPDCCH in MTC-SIB subframes. The MTC SIB subframes refer to subframes configured by an MIB for MTC SIB1 and configured for MTC SIB transmission by MTC SIB1 for other SIBs. If the number of EPDCCH repetitions is greater than 1 (i.e., R>1), the UE may assume that the EPDCCH is not transmitted in the MTC SIB subframes. In other words, if the UE monitors the EPDCCH in a narrowband for transmitting MTC SIB(s), the UE does not expect that the EPDCCH is received in subframes configured for the MTC SIB(s).

Notably, the UE according to the present invention includes MTC SIB subframes in the number of EPDCCH repetitions, thereby counting the number of EPDCCH repetitions. For example, if the number of EPDCCH repetitions is R and one of R consecutive DL subframes is configured for MTC SIB transmission, it is proposed according to an embodiment of the present invention that the UE monitor the EPDCCH in R subframes including an MTC SIB subframe as illustrated in FIG. 14(b) rather than monitoring the EPDCCH in R subframes except for the MTC SIB subframe as illustrated in FIG. 14(a).

Such an embodiment of the present invention concerning collision between an EPDCCH repetition subframe and an SIB subframe may be identically applied even to PDSCH transmission. For example, if even subframes not used for EPDCCH/PDSCH transmission are configured as subframes available for DL transmission through an MTC SIB, these subframes may be counted as EPDCCH/PDSCH repetitions.

Figure 15:
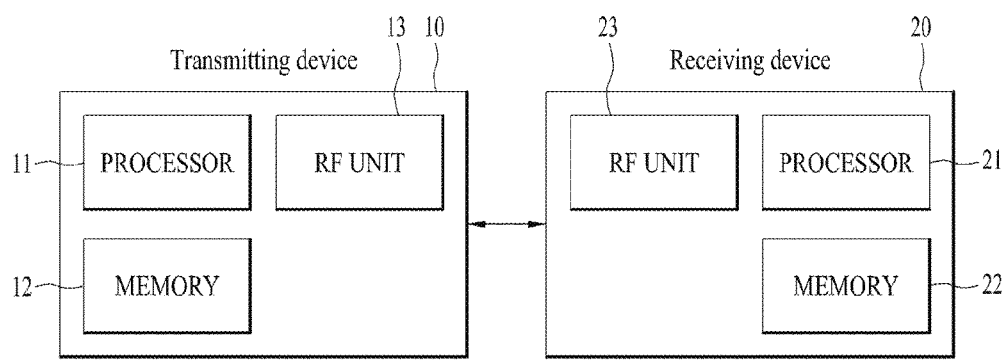
FIG. 15 is a block diagram illustrating elements of a transmitting device 10 and a receiving device 20 for implementing the present invention.

FIG. 15 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention may control the eNB RF unit to repeatedly transmit an EPDCCH during a plurality of subframes according to any one or a combination of two or more of Embodiments A to F. The eNB processor may control the eNB RF unit to transmit EPDCCH configuration information at least including information indicating a plurality of subframes associated with EPDCCH repetitions, information about the number of EPDCCH repetitions, or a frequency band for EPDCCH monitoring (or frequency band information corresponding to an EPDCCH search space). The eNB processor may control the eNB RF unit to transmit an MIB for the UE. The MIB may at least include information indicating a subframe in which SIB1 is to be transmitted or a frequency resource on which SIB1 is to be transmitted. The eNB processor may control the eNB RF unit to transmit SIB1 in subframe(s) configured for SIB1 transmission. SIB1 may at least include information indicating subframe(s) in which other SIB(s) are transmitted or information indicating a frequency resource on which other SIB(s) are transmitted. The eNB processor may control the eNB RF unit to transmit other SIB(s) according to SIB1. The eNB processor may control the eNB RF unit to perform repeated transmission of the EPDCCH according to the EPDCCH configuration information. The eNB processor may perform repeated transmission of the EPDCCH during subframes corresponding to a preset number of repetitions. The preset number of repetitions may be greater than or equal to the number of actual repetitions of EPDCCH transmission. The eNB processor may control the eNB RF unit not to perform EPDCCH transmission in a subframe in which a frequency band for the EPDCCH collides with a frequency resource used for SIB1 transmission. Upon calculating the number of EPDCCH repetitions, the eNB processor may count subframes in which SIB1 collides with the EPDCCH. The eNB processor may control the eNB RF unit not to perform EPDCCH transmission in a subframe in which the frequency band for the EPDCCH collides with the frequency resource used for SIB transmission. Upon calculating the number of EPDCCH repetitions, the eNB processor may count a subframe in which SIB1 collides with the EPDCCH. In other words, while the eNB processor controls the eNB RF unit not to perform EPDCCH transmission in a subframe in which a frequency resource configured for the EPDCCH collides with a frequency resource configured for SIB(s), the eNB processor may control the eNB RF unit to perform repeated transmission of the EPDCCH by counting the number of EPDCCH repetitions including the subframe in which the EPDCCH collides with the SIBs. In this case, even if the number of subframes in which the SIBs collides with the EPDCCH varies, a subframe duration during which the eNB processor controls repeated transmission is not changed.

The UE processor of the present invention may control the UE RF unit to repeatedly receive an EPDCCH during a plurality of subframes according to any one or a combination of two or more of Embodiments A to F. The UE processor may control the UE RF unit to receive EPDCCH configuration information at least including information indicating a plurality of subframes associated with EPDCCH repetitions, information about the number of EPDCCH repetitions, or a frequency band for EPDCCH monitoring (or frequency band information corresponding to an EPDCCH search space). The UE processor may control the UE RF unit to transmit an MIB for the UE. The MIB may at least include information indicating a subframe in which SIB1 is to be transmitted or a frequency resource on which SIB1 is to be transmitted. The UE processor may control the UE RF unit to receive SIB1 in subframe(s) configured for SIB1 transmission. SIB1 may at least include information indicating subframe(s) in which other SIB(s) are transmitted or information indicating a frequency resource on which other SIB(s) are transmitted. The UE processor may control the UE RF unit to receive other SIB(s) according to SIB1. The UE processor may control the UE RF unit to perform repeated reception of the EPDCCH according to the EPDCCH configuration information. The UE processor may perform repeated reception of the EPDCCH during subframes corresponding to a preset number of repetitions. The preset number of repetitions may be greater than or equal to the number of actual repetitions of EPDCCH transmission. The UE processor may control the UE RF unit not to perform EPDCCH reception in a subframe in which a frequency band for the EPDCCH collides with a frequency resource used for SIB1 transmission. Upon calculating the number of EPDCCH repetitions, the UE processor may count subframes in which SIB1 collides with the EPDCCH. The UE processor may control the UE RF unit not to perform EPDCCH reception in a subframe in which the frequency band for the EPDCCH collides with the frequency resource used for SIB transmission. Upon calculating the number of EPDCCH repetitions, the UE processor may count a subframe in which SIB1 collides with the EPDCCH. In other words, the UE processor does not expect that the EPDCCH is received in a subframe in which the frequency resource configured for the EPDCCH collides with a frequency resource configured for SIB(s) and may not perform EPDCCH monitoring. However, the UE processor may be configured to count the number of EPDCCH repetitions including the subframe in which the EPDCCH collides with the SIBs. In this case, even if the number of subframes in which the SIBs collides with the EPDCCH varies, a subframe duration during which the UE monitors the EPDCCH is not changed. In other words, a start subframe of EPDCCH repetition and an end subframe of EPDCCH repetition are not changed.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:
1. A method of receiving a downlink (DL) reference signal by a user equipment (UE), the method comprising:
receiving first configuration information on a partial frequency band for a downlink channel in an entire DL system frequency band;
receiving second configuration information on subframes for power boosting;
receiving cell-specific reference signals (CRSs) in the partial frequency band in each of a plurality of subframes, based on the first configuration information;
receiving the downlink channel within the partial frequency band repeatedly in N subframes among the plurality of subframes based on a number N of repetitions, where N is a positive integer larger than 1; and
performing DL channel measurement based on the received CRSs based on the second configuration information,
wherein the plurality of subframes include the subframes for power boosting, and
wherein performing the DL channel measurement includes performing the DL channel measurement:
based on a first CRS power level in each subframe other than the subframes for power boosting among the plurality of subframes, and
based on the first CRS power level in two front orthogonal frequency division multiplexing (OFDM) symbols in each of the subframes for power boosting and a second CRS power level in OFDM symbols other than the two front OFDM symbols in each of the subframes for power boosting,
wherein the second CRS power level is higher than the first CRS power level.

2. A user equipment (UE) for receiving a downlink (DL) reference signal, the UE comprising:
a transceiver; and
a processor configured to control the transceiver,
wherein the processor is configured to
control the transceiver to receive first configuration information on a partial frequency band for a downlink channel in an entire DL system frequency band,
control the transceiver to receive second configuration information on subframes for power boosting,
control the transceiver to receive cell-specific reference signals (CRSs) in the partial frequency band in each of a plurality of subframes based on the first configuration information,
control the transceiver to receive the downlink channel within the partial frequency band repeatedly in N subframes among the plurality of subframes based on a number N of repetitions, where N is a positive integer larger than 1; and
perform DL channel measurement based on the received CRSs based on the second configuration information,
wherein the plurality of subframes include the subframes for power boosting, and
wherein the processor is configured to perform the DL channel measurement:
based on a first CRS power level in each subframe other than the subframes for power boosting among the plurality of subframes, and
based on the first CRS power level in two front orthogonal frequency division multiplexing (OFDM) symbols in each of the subframes for power boosting and a second CRS power level in OFDM symbols other than the two front OFDM symbols in each of the subframes for power boosting,
wherein the second CRS power level is higher than the first CRS power level.

3. A method of transmitting a downlink (DL) reference signal by a base station (BS), the method comprising:
transmitting first configuration information on a partial frequency band for a downlink channel in an entire DL system frequency band;
transmitting second configuration information on subframes for power boosting;
transmitting cell-specific reference signals (CRSs) in the partial frequency band in each of a plurality of subframes based on the first and second configuration information;
transmitting the downlink channel within the partial frequency band repeatedly in N subframes among the plurality of subframes based on a number N of repetitions, where N is a positive integer larger than 1; and
receiving a result of DL channel measurement related to the transmitted CRSs,
wherein the plurality of subframes include the subframes for power boosting, and
wherein transmitting the CRSs includes transmitting the CRSs:
with a first CRS power level in each subframe other than the subframes for power boosting among the plurality of subframes, and
with the first CRS power level in two front orthogonal frequency division multiplexing (OFDM) symbols in each of the subframes for power boosting and with a second CRS power level in OFDM symbols other than the two front OFDM symbols in each of the subframes for power boosting,
wherein the second CRS power level is higher than the first CRS power level.

4. A base station (BS) for transmitting a downlink (DL) reference signal, the BS comprising:
a transceiver; and
a processor configured to control the transceiver,
wherein the processor is configured to
control the transceiver to transmit first configuration information on a partial frequency band for a downlink channel in an entire DL system frequency band,
transmit second configuration information on subframes for power boosting,
control the transceiver to transmit cell-specific reference signals (CRSs) in the partial frequency band in each of a plurality of subframes based on the first and second configuration information,
control the transceiver to transmit the downlink channel within the partial frequency band repeatedly in N subframes among the plurality of subframes based on a number N of repetitions, where N is a positive integer larger than 1; and
control the transceiver to receive a result of DL channel measurement related to the transmitted CRSs,
wherein the plurality of subframes include the subframes for power boosting, and
wherein the processor is configured to control the transceiver to transmit the CRSs:
with a first CRS power level in each subframe other than the subframes for power boosting among the plurality of subframes, and
with the first CRS power level in two front orthogonal frequency division multiplexing (OFDM) symbols in each of the subframes for power boosting and with a second CRS power level in OFDM symbols other than the two front OFDM symbols in each of the subframes for power boosting,
wherein the second CRS power level is higher than the first CRS power level.

5. The method according to claim 1, wherein the CRSs are present in a same resource element pattern per resource block on the partial frequency band in each of the plurality of subframes.

6. The method according to claim 1, wherein the downlink channel is received based on a higher power level in the subframes for power boosting than a power level in subframes other than the subframes for power boosting.

7. The method according to claim 1, further comprising:
receiving third configuration information on subframes unavailable for the downlink channel,
wherein the downlink channel is present in each of N-L subframes among the N subframes and not present in L subframes unavailable for the downlink channel among the N subframes, where L is a non-negative integer smaller than N.

8. The method according to claim 1, further comprising:
receiving fourth configuration information on subframes for system information,
wherein the downlink channel is present in each of N-M subframes among the N subframes and not present in M subframes among the N subframes, and
wherein the M subframes is subframes in which the partial frequency band for the downlink channel overlaps with a frequency band for the system information among the N subframes, where M is a non-negative integer smaller than N.

9. The UE according to claim 2, wherein the CRSs are received in a same resource element pattern per resource block on the partial frequency band in each of the plurality of subframes.

10. The UE according to claim 2, wherein the downlink channel is received based on a higher power level in the subframes for power boosting than a power level in subframes other than the subframes for power boosting.

11. The UE according to claim 2,
wherein the processor is configured control the transceiver to receive third configuration information on subframes unavailable for the downlink channel,
wherein the downlink channel is present in each of N-L subframes among the N subframes and not present in L subframes unavailable for the downlink channel among the N subframes, where L is a non-negative integer smaller than N.

12. The UE according to claim 2,
wherein the processor is configured control the transceiver to receive fourth configuration information on subframes for system information,
wherein the downlink channel is present in each of N-M subframes among the N subframes and not present in M subframes among the N subframes, and
wherein the M subframes is subframes in which the partial frequency band for the downlink channel overlaps with a frequency band for the system information among the N subframes, where M is a non-negative integer smaller than N.

13. The method according to claim 3, wherein the CRSs are transmitted in a same resource element pattern per resource block on the partial frequency band in each of the plurality of subframes.

14. The method according to claim 3, wherein the downlink channel is transmitted with a higher power level in the subframes for power boosting than a power level in subframes other than the subframes for power boosting.

15. The method according to claim 3, further comprising:
transmitting third configuration information on subframes unavailable for the downlink channel,
wherein the downlink channel is transmitted in each of N-L subframes among the N subframes and not transmitted in L subframes unavailable for the downlink channel among the N subframes, where L is a non-negative integer smaller than N.

16. The method according to claim 3, further comprising:
transmitting fourth configuration information on subframes for system information,
wherein the downlink channel is transmitted in each of N-M subframes among the N subframes and not transmitted in M subframes among the N subframes, and
wherein the M subframes is subframes in which the partial frequency band for the downlink channel overlaps with a frequency band for the system information among the N subframes, where M is a non-negative integer smaller than N.

17. The BS according to claim 4, wherein the CRSs are transmitted in a same resource element pattern per resource block on the partial frequency band in each of the plurality of subframes.

18. The BS according to claim 4, wherein the downlink channel is transmitted with a higher power level in the subframes for power boosting than a power level in subframes other than the subframes for power boosting.

19. The BS according to claim 4,
wherein the processor is configured to control the transceiver to transmit third configuration information on subframes unavailable for the downlink channel,
wherein the downlink channel is transmitted in each of N-L subframes among the N subframes and not transmitted in L subframes unavailable for the downlink channel among the N subframes, where L is a non-negative integer smaller than N.

20. The BS according to claim 4,
wherein the processor is configured to control the transceiver to transmit fourth configuration information on subframes for system information,
wherein the downlink channel is transmitted in each of N-M subframes among the N subframes and not transmitted in M subframes among the N subframes, and
wherein the M subframes is subframes in which the partial frequency band for the downlink channel overlaps with a frequency band for the system information among the N subframes, where M is a non-negative integer smaller than N.

\* \* \* \* \*